(12) United States Patent
Des Champs et al.

(10) Patent No.: US 11,906,197 B1
(45) Date of Patent: Feb. 20, 2024

(54) SYSTEMS, DEVICES, AND/OR METHODS FOR MANAGING CONDENSATE

(71) Applicant: Des Champs Technologies LLC, Natural Bridge Station, VA (US)

(72) Inventors: Nicholas Howard Des Champs, Fincastle, VA (US); Leonardo Brito Manes, Roanoke, VA (US)

(73) Assignee: Des Champs Technologies LLC, Natural Bridge Station, VA (US)

( * ) Notice: Subject to any disclaimer, the term of this patent is extended or adjusted under 35 U.S.C. 154(b) by 0 days.

(21) Appl. No.: 18/386,782

(22) Filed: Nov. 3, 2023

Related U.S. Application Data

(63) Continuation of application No. 18/345,392, filed on Jun. 30, 2023, now Pat. No. 11,808,482.

(51) Int. Cl.
*F24F 13/22* (2006.01)

(52) U.S. Cl.
CPC ................... *F24F 13/222* (2013.01)

(58) Field of Classification Search
CPC ... F24F 13/222; F24F 2013/227; F16K 15/04; F25D 21/14
See application file for complete search history.

(56) References Cited

U.S. PATENT DOCUMENTS 9,777,957 B1 * 10/2017 Des Champs .......... F25D 21/14

* cited by examiner

*Primary Examiner* — Elizabeth J Martin
(74) *Attorney, Agent, or Firm* — Michael Haynes PLC; Michael N. Haynes

(57) ABSTRACT

Certain exemplary embodiments can provide a system, machine, device, and/or manufacture that is configured for operably releasing condensate received from a condensate-producing unit toward a drain without allowing a substantial quantity of gas to flow through the system, machine, device, and/or manufacture, those embodiments including a valve, a spring, and/or a housing.

14 Claims, 14 Drawing Sheets

5100

5100

5100

5120

5340

5140

5480
5420

SYSTEMS, DEVICES, AND/OR METHODS FOR MANAGING CONDENSATE

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

Drawing Key

Figure 1:
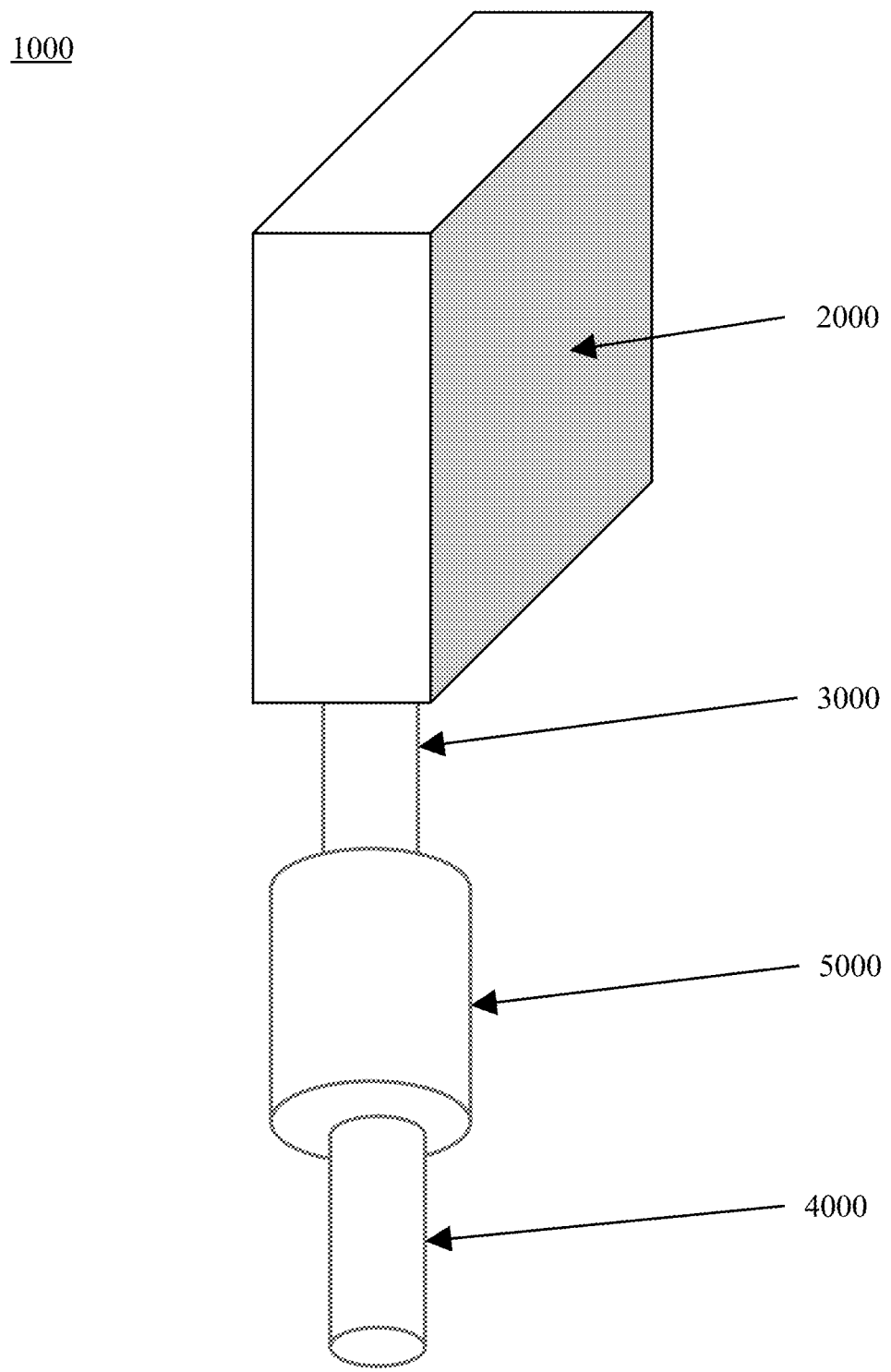
FIG. 1 is a perspective view of an exemplary embodiment of a condensate management system 1000.

| Element Name | Element Number |
| --- | --- |
| Condensate Management System | 1000 |
| Condensate Producing Unit | 2000 |
| Condensate Supply Conduit | 3000 |
| Condensate Drain Conduit | 4000 |
| Automatic Condensate Release Device | 5000 |
| Housing | 5100 |
| First Housing Portion | 5120 |
| Second Housing Portion | 5140 |
| Reservoir | 5220 |
| Chamber | 5240 |
| Release Port | 5300 |
| Valve Seat | 5320 |
| Valve Guide | 5340 |
| Lock | 5400 |
| Arm | 5410 |
| Arm Guide | 5420 |
| Hook | 5430 |
| Catch | 5440 |
| First Locking Surface | 5450 |
| Second Locking Surface | 5460 |
| Arm Grip | 5470 |
| Arm End | 5480 |
| Spring Seat | 5500 |
| First Circumferential Housing Sealing Surface | 5620 |
| First Compressive Housing Sealing Surface | 5640 |
| Second Circumferential Housing Sealing Surface | 5660 |
| Second Compressive Housing Sealing Surface | 5680 |
| First Circumferential Housing Seal | 5720 |
| First Compressive Housing Seal | 5740 |
| Second Circumferential Housing Seal | 5760 |
| Second Compressive Housing Seal | 5780 |
| First Inlet Circumferential Fluidic Sealing Surface | 5820 |
| Second Inlet Circumferential Fluidic Sealing Surface | 5840 |
| Third Inlet Circumferential Fluidic Sealing Surface | 5860 |
| First Outlet Circumferential Fluidic Sealing Surface | 5920 |
| Second Outlet Circumferential Fluidic Sealing Surface | 5940 |
| Third Outlet Circumferential Fluidic Sealing Surface | 5960 |
| Valve | 6000 |
| Valve Outer Surface | 6100 |
| Spring | 7000 |
| O-ring | 8000 |

DESCRIPTION

Certain exemplary embodiments relate to the technical field of heating, ventilating, and/or air conditioning ("HVAC"). In certain exemplary embodiments, HVAC systems (such as heat pumps and/or central air conditioners) in residential and/or commercial buildings can include an "outdoor" unit comprising a refrigerant compressor and condenser outside of the conditioned space and an air handler comprising a supply fan and an evaporator in a mechanical room, basement, or attic. The air handler then can supply conditioned air through a series of supply ducts to distribute the air to various supply registers at predetermined points throughout the area to be conditioned. To get the air back to the air handler there can be return registers stationed at predetermined points that feed the spent conditioned air into return ducts.

Yet via this arrangement, approximately half the energy consumed by the HVAC system can be due to overcoming the pressure drop caused by (and/or fluidic resistance to) moving and distributing air through the ducts that deliver and return the air through the conditioned space. Moreover, the cost of installing this ductwork can be substantial.

Thus, certain exemplary embodiments can rely upon an HVAC system that can essentially eliminate ductwork by incorporating several small individual air handlers that replace the supply registers that would be used in a central HVAC system. These small air handlers can incorporate an air filter, fan, and/or conditioning coil. As a result, refrigerant lines can be run from the outdoor unit to each "mini" air handler, which can be much less expensive than installing air ducting.

Each of these indoor air handling units (sometimes referred to herein as a "mini split") can have a cooling coil that can generate condensate (particularly when the unit is in cooling mode) by condensing water vapor that is dispersed/dissolved in the indoor air (thereby dropping the temperature of that air). Since the mini split need only recirculate the air within the local space, that is, air can enter at the top of the air handler and exit out the bottom, the fan pressure drop can be only that created by air flow through the air filter and the cooling coil. Conditioned air at the cooling coil can be at a slightly positive pressure or a slightly negative pressure, e.g., a pressure ranging from approximately minus 0.5 inches to approximately plus 0.5 inches of water column. During warm and/or humid periods, the cooling coil can generate a substantial amount of condensate (which herein will often be referred to as "water", although the condensate need not be the direct result of condensation, need not be water, and any water need not be pure (e.g., it can contain a refrigerant, minerals, dust, and/or debris, etc.)).

Certain exemplary embodiments relate to automatic condensate release devices, or "traps", that can allow condensate to drain from a condensate source (or a conduit that descends therefrom), such as an HVAC, air conditioning, ice-making, cooling, humidifying, dehumidifying, and/or other condensate-producing unit, and simultaneously prevent a gas, such as ambient air, conditioned air, combustion gas, and/or drain gas from entering and/or escaping from the unit.

Note that as used herein, "gas" need not be limited to any particular gas, but instead can be or include vapors, liquids, and/or solids, etc., such as any form of air, conditioned air, combustion gas, drain gas, smoke, steam, refrigerant, dust, etc. Note that as used herein, "air" need not be pure air, but instead can be or include vapors, liquids, and/or solids, etc., other than pure air, such as smoke, steam, refrigerant, dust, etc. Certain exemplary embodiments are in the technical field of a condensate drainage system that allows removal of water from a condensate-producing unit while simultaneously preventing the passage of gas and/or conditioned air from the unit and/or drain gas and/or air into the unit. Note that discussions herein of pressure are described with respect to ambient atmospheric pressure (e.g., approximately 14.7 psia at sea level).

Certain exemplary embodiments need not require standing water to prevent gas from leaving a condensate-producing unit. With the occurrence of condensate within the unit, the condensate can flow out of the unit toward the trap but without escape of a substantial quantity/volume/flow of gas from the unit. When there is no condensate produced, there can be essentially no liquid remaining in the trap yet there can be substantially no gas flowing through the trap from or toward the condensate-producing unit.

To remove condensate from a condensate-producing unit, certain exemplary embodiments can employ a standpipe device known as a "P-trap" (although the shape can more closely resemble the letter "U") can be used. When properly designed and operating for a condensate-producing unit, a P-trap can allow condensate to exit a positively-pressured condensate-producing unit (and/or a portion and/or zone of the condensate-producing unit, i.e., the "positive side", such as a positive plenum) while preventing positively-pressured gas from leaving and/or can prevent ambient and/or drain gas from entering the condensate-producing unit when the unit is at negative pressure.

In certain embodiments, however, there can be challenges with using a P-trap, e.g.:
standing water is required for sealing against airflow within the P-trap and that water can be prone to freezing if the condensate-producing unit is installed in an unheated space such as an attic or commercial rooftop unit;
to maintain a sufficient water level to allow the P-trap to operate properly at beginning of the cooling season, the trap typically must be very deep to prevent dry-out from evaporation, which can lead to sludge buildup at the bottom of the "U" shaped section; and/or
to handle a substantial pressure differential between ambient and higher pressure (blowing through the condensate-producing unit) or between ambient and lower pressure (drawing air through the condensate producing unit (e.g., between the inlet and outlet of the trap), a P-trap would need to extend well below the condensate pan and even the frame of the condensate-producing unit, and possibly a substantial distance into the floor that supports the condensate-producing unit, resulting in the need for rails or curbs to be placed under the unit to raise the drain pan and enable enough height between the drain pan outlet and the bottom of the trap, and/or to prevent the sealing water from being blown out of the trap and the loss of an air seal.

Our attempts to solve the problems associated with using P-traps for certain exemplary applications have presented several further challenges. For example, P-traps can require a relatively large reservoir of liquid stored within the trap to prevent evaporation and/or loss of water seal. This large amount of liquid, in many installations, can be prone to freezing, which can damage the trap, the condensate conduit, components of the condensate-producing unit, and/or the building structure.

As another example, when the condensate-producing unit is first installed, it is highly likely that the liquid in the trap reservoir is nonexistent or has receded to a level that permits gas, such as conditioned air or combustion gas, to flow from the positive pressure side of the fan, through the interstices of the trap, and into the drain.

Certain exemplary embodiments can accomplish the functions desired for a trap without encountering such challenges. Certain exemplary embodiments can trap and release condensate and/or deter and/or prevent gas, such as conditioned air, from leaving the positive pressure side of the condensate-producing unit toward the drainage conduit (or from entering the negative pressure side of the condensate-producing unit from the drainage conduit), all within an extremely compact design.

Certain exemplary embodiments can provide a trap that is configured to operate dry (e.g., not allow gas to pass through and/or out of the trap) when the condensate-producing unit is not producing condensate but is otherwise operating to heat, sensibly cool, or simply move air. Certain exemplary embodiments can provide a trap that, when the unit is operating, allow condensate to flow from a point of condensate generation within the unit, through the trap, and to a drain, such as a house gutter, a roof drain, a sewer, and/or a ground level storm drain, while simultaneously deterring and/or not allowing positively pressured gas to flow out of the unit's positively pressurized side or ambient air to be drawn into the unit if the unit is negatively pressurized (e.g., to not allow gas to pass through and/or out of the trap).

Certain exemplary embodiments can operate to remove water from a condensate-producing unit when the water is produced in a negative pressure relative to ambient. With no water produced, the valve of the trap can stay against the seat (such as by air pressure differential and/or a spring force) such that substantially no air flows.

Figure 2:
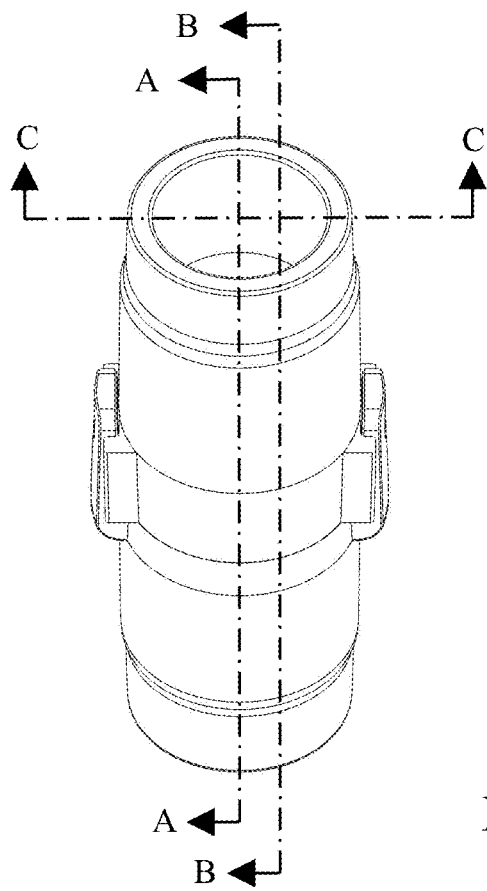
FIG. 2 is a top perspective view of an exemplary embodiment of a automatic condensate release device or "trap" housing 5100.
Figure 3:
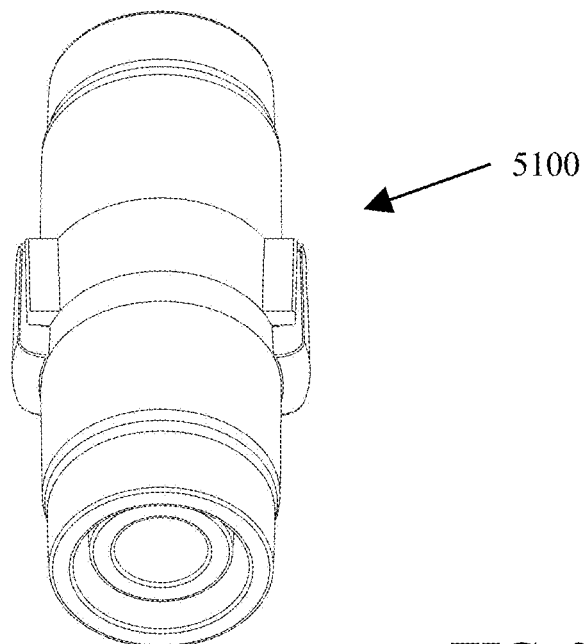
FIG. 3 is a bottom perspective view of an exemplary embodiment of a trap housing 5100.
Figure 4:
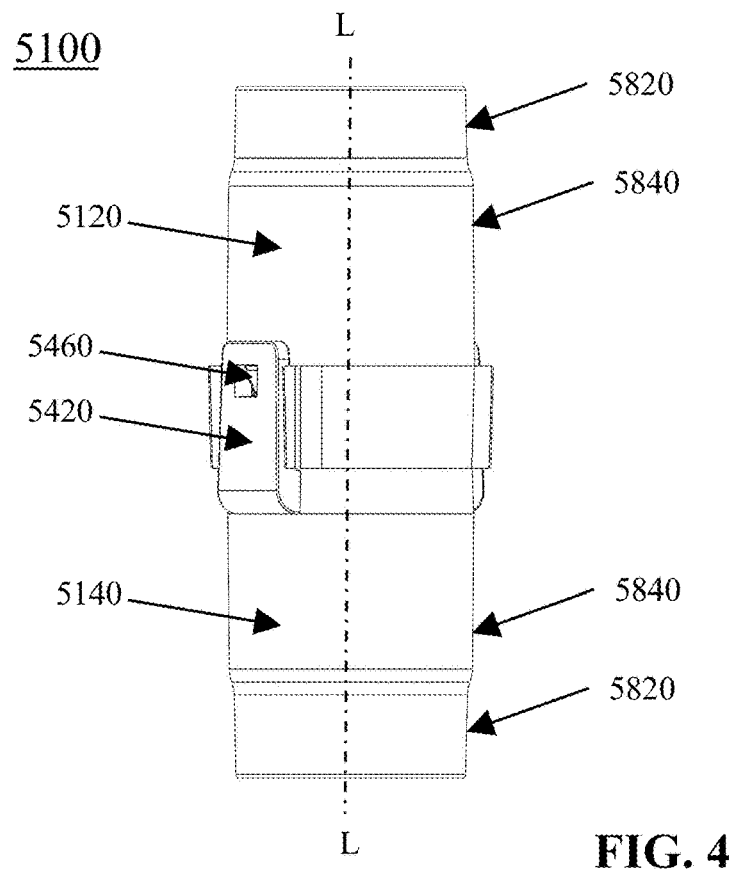
FIG. 4 is a side view of an exemplary embodiment of a trap housing 5100.
Figure 5:
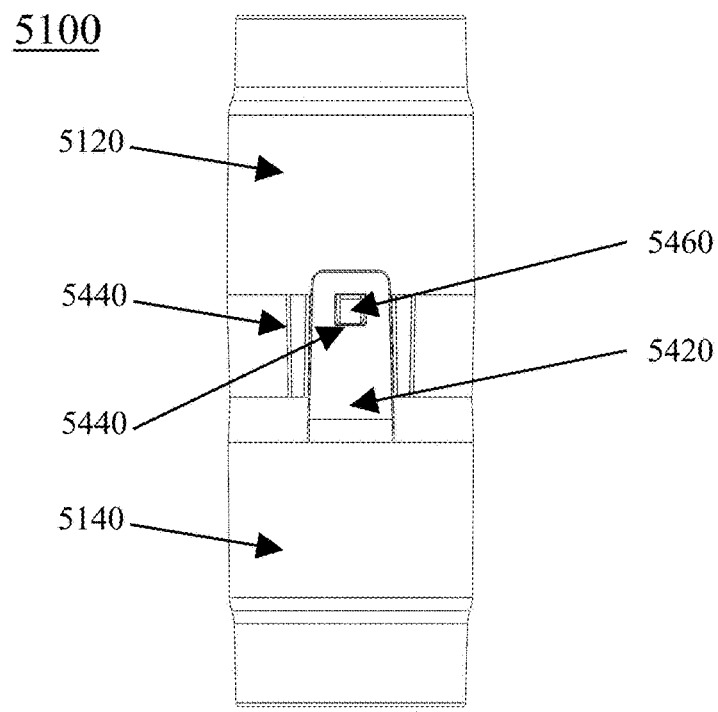
FIG. 5 is a side view of an exemplary embodiment of a trap housing 5100.
Figure 6:
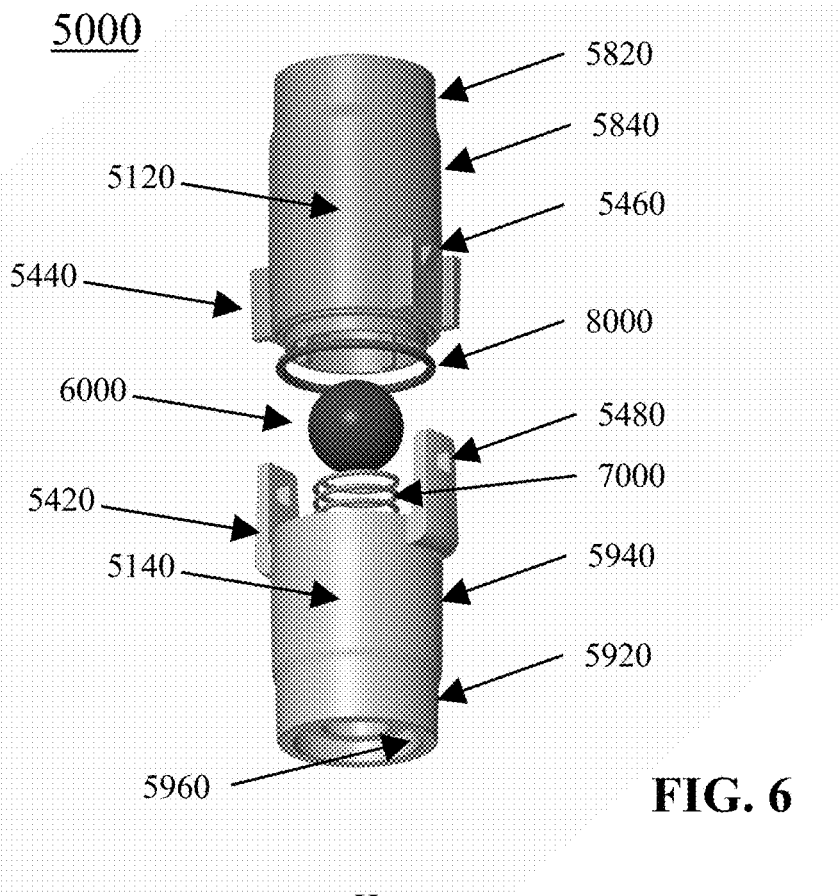
FIG. 6 is a bottom perspective assembly view of an exemplary embodiment of a trap 5000.
Figure 7:
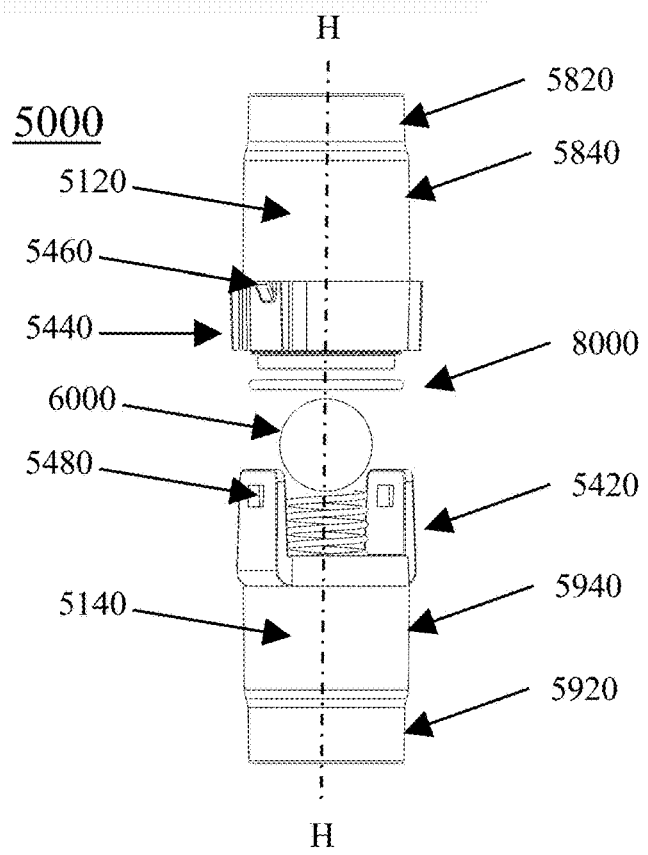
FIG. 7 is a front assembly view of an exemplary embodiment of a trap 5000.
Figure 8:
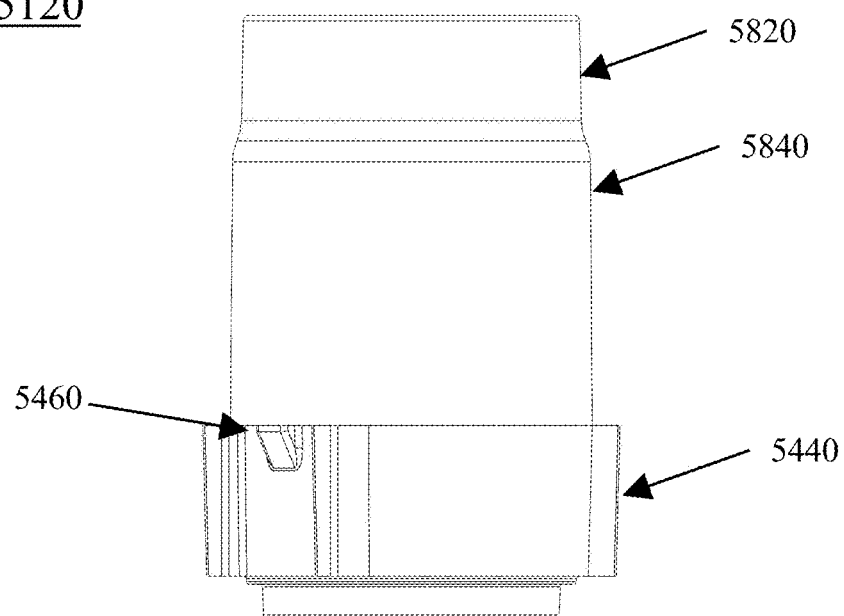
FIG. 8 is a front view of an exemplary embodiment of a first housing portion 5120.
Figure 9:
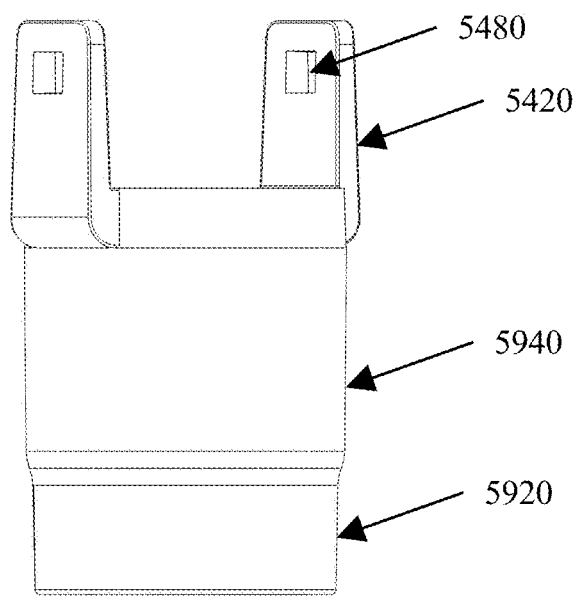
FIG. 9 is a front view of an exemplary embodiment of a second housing portion 5140.
Figure 10:
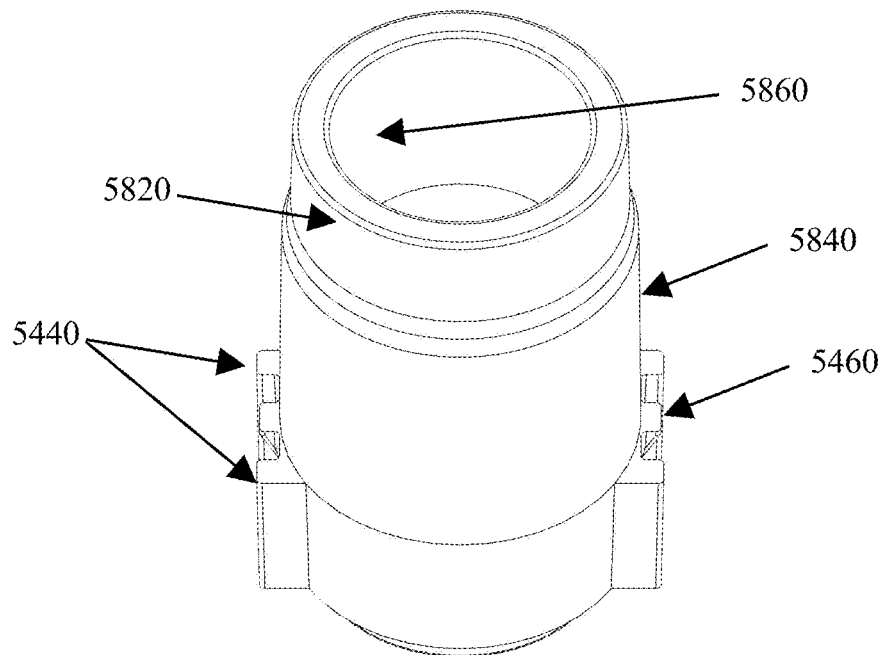
FIG. 10 is a top perspective view of an exemplary embodiment of a first housing portion 5120.
Figure 11:
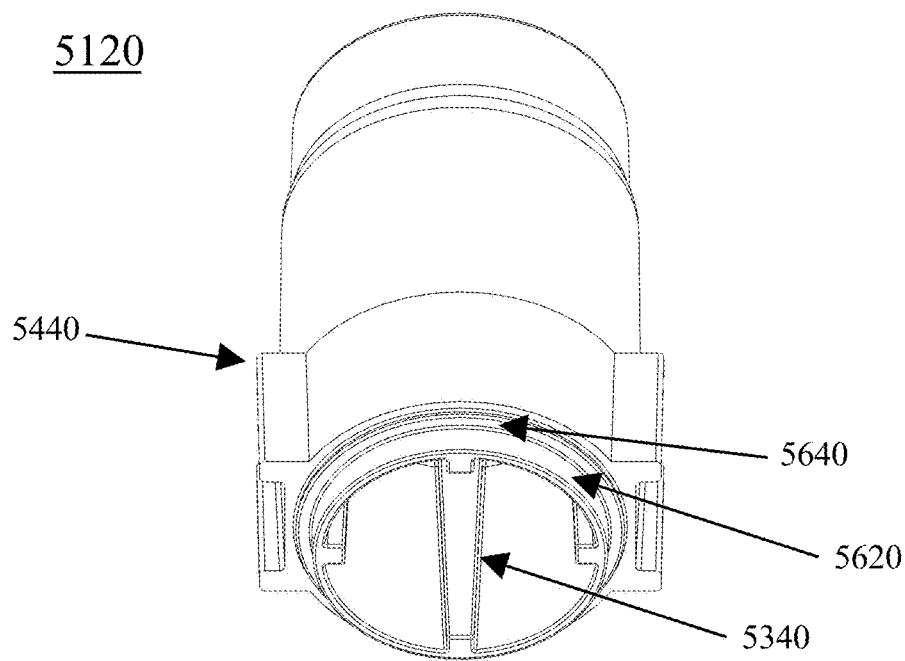
FIG. 11 is a bottom perspective view of an exemplary embodiment of a first housing portion 5120.
Figure 12:
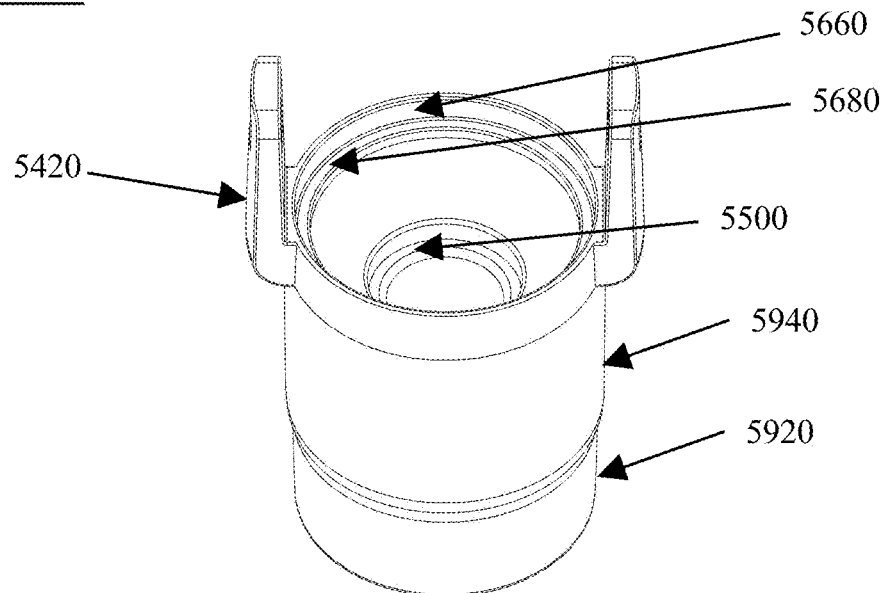
FIG. 12 is a top perspective view of an exemplary embodiment of a second housing portion 5140.
Figure 13:
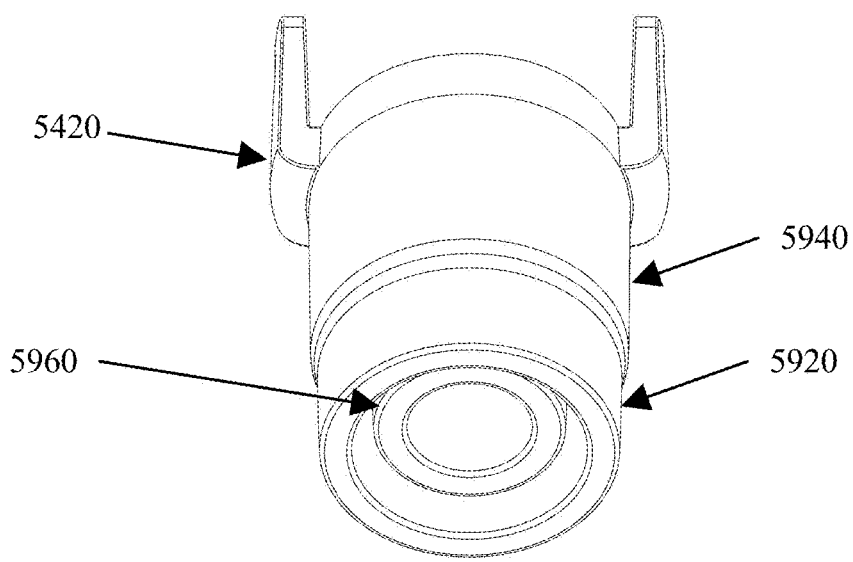
FIG. 13 is a bottom perspective view of an exemplary embodiment of a second housing portion 5140.
Figure 14:
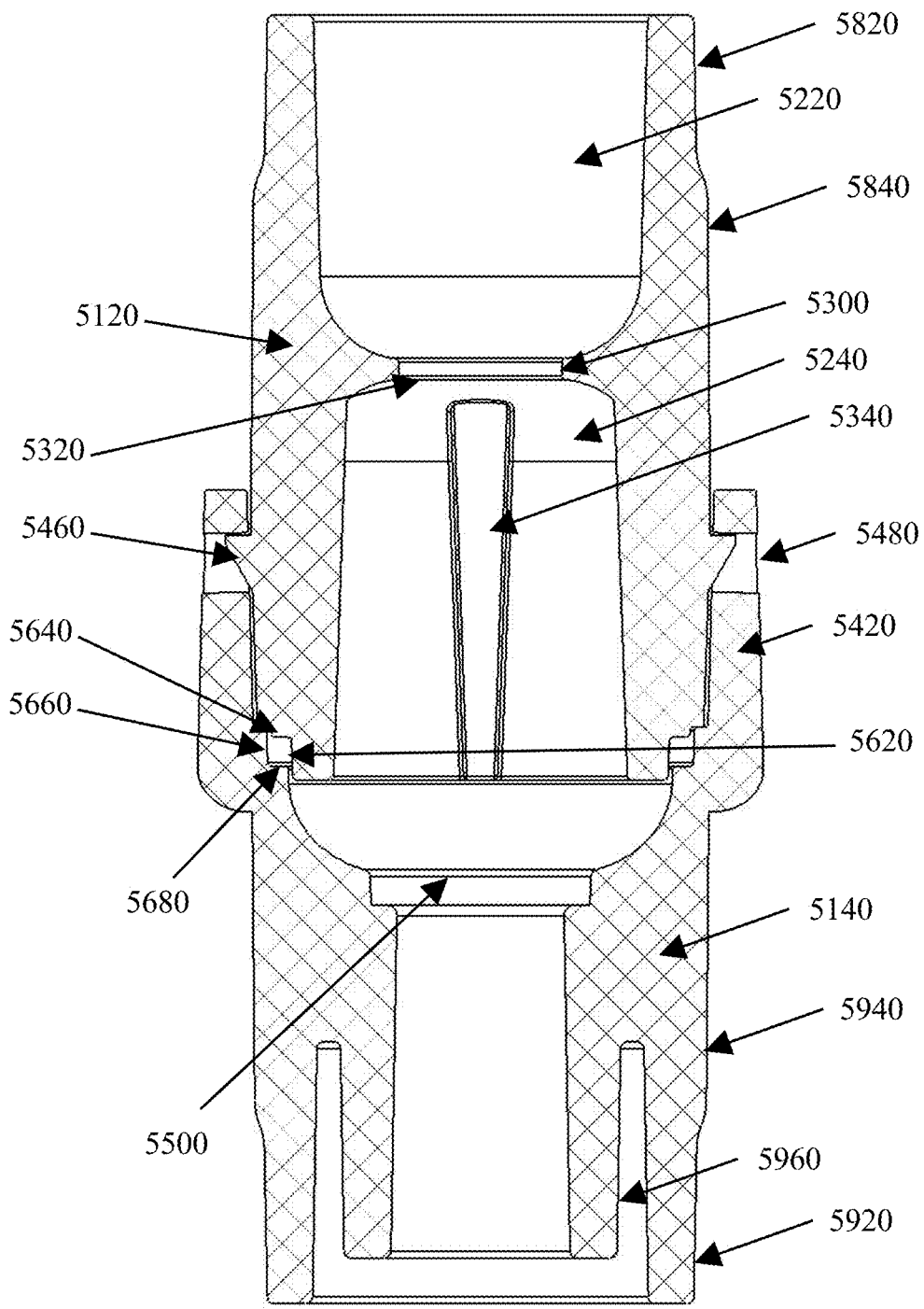
FIG. 14 is a side cross-sectional view, taken at section C-C, of an exemplary embodiment of a trap housing 5100.
Figure 15:
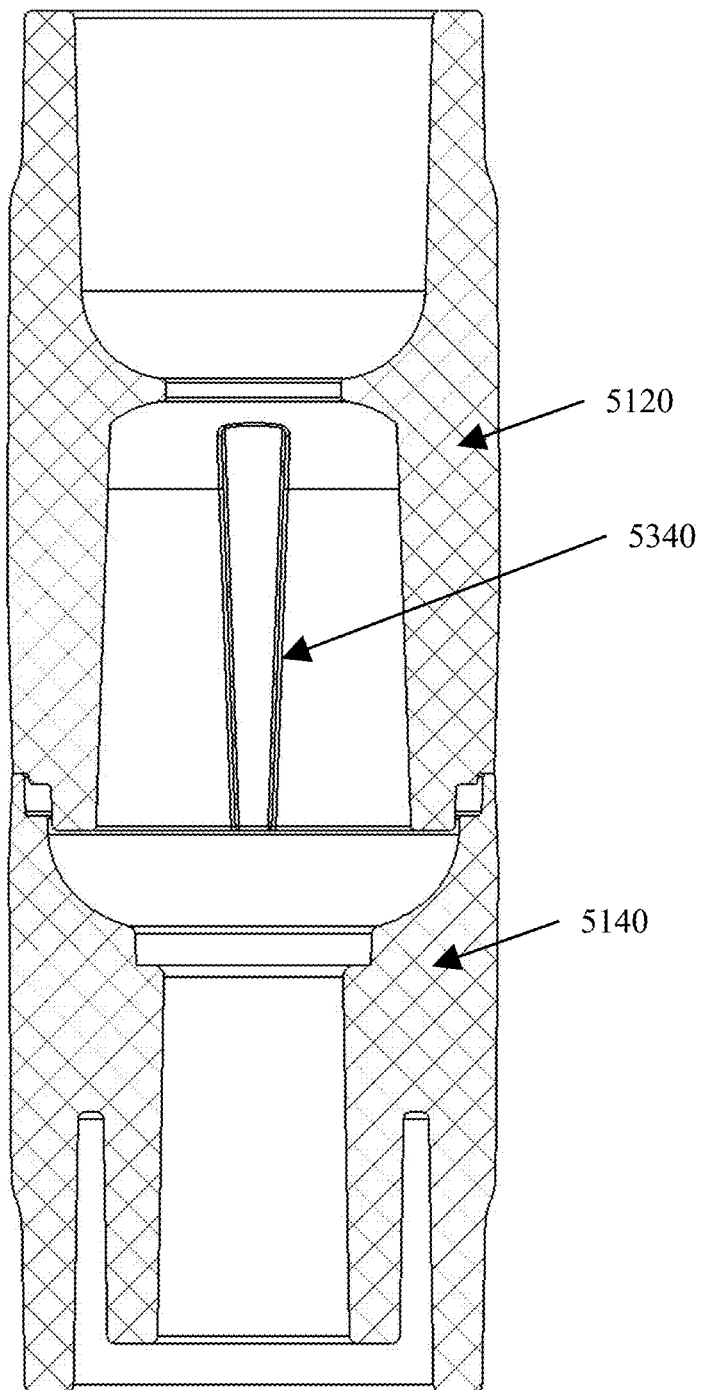
FIG. 15 is a side cross-sectional view, taken at section A-A, of an exemplary embodiment of a trap housing 5100.
Figure 16:
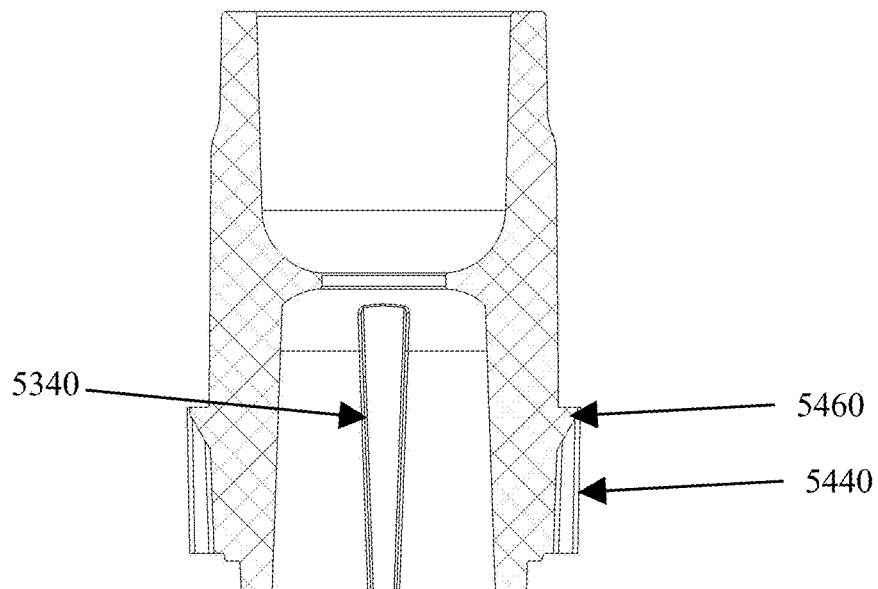
FIG. 16 is a side cross-sectional view, taken at section A-A, of an exemplary embodiment of a first housing portion 5120.
Figure 17:
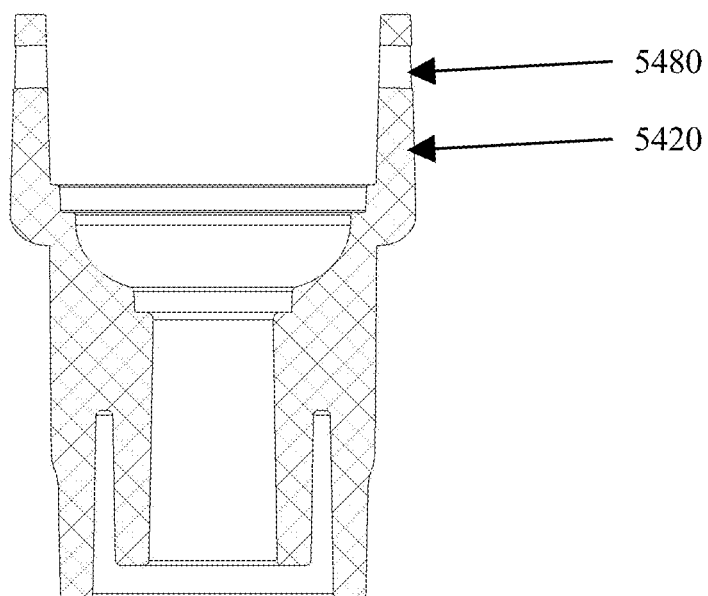
FIG. 17 is a side cross-sectional view, taken at section A-A, of an exemplary embodiment of a second housing portion 5140.
Figure 18:
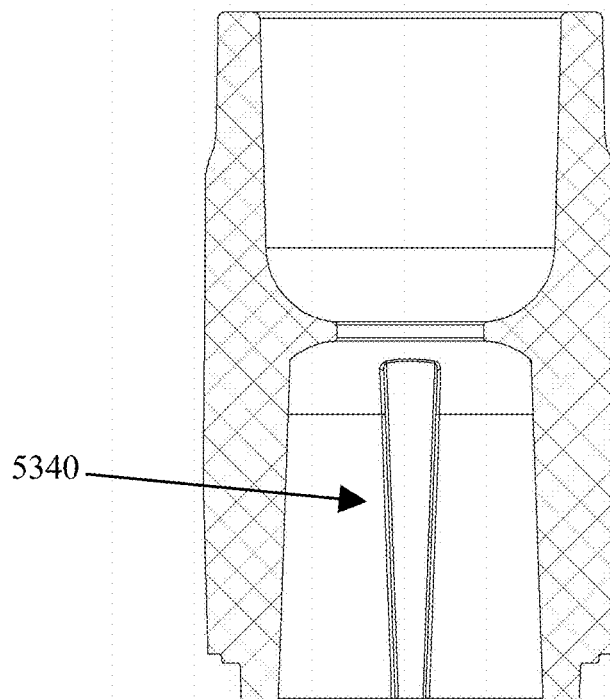
FIG. 18 is a side cross-sectional view, taken at section C-C, of an exemplary embodiment of a first housing portion 5120.
Figure 19:
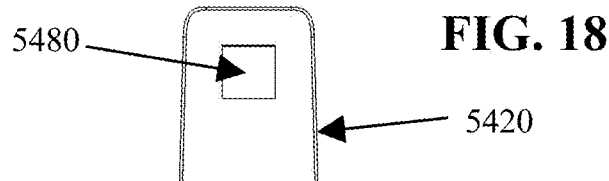
FIG. 19 is a side cross-sectional view, taken at section C-C, of an exemplary embodiment of a second housing portion 5140.
Figure 19:
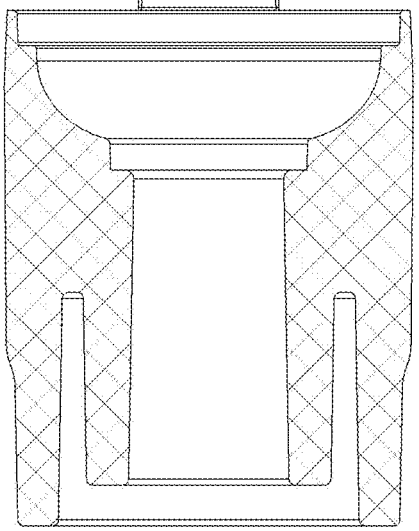
Figure 20:
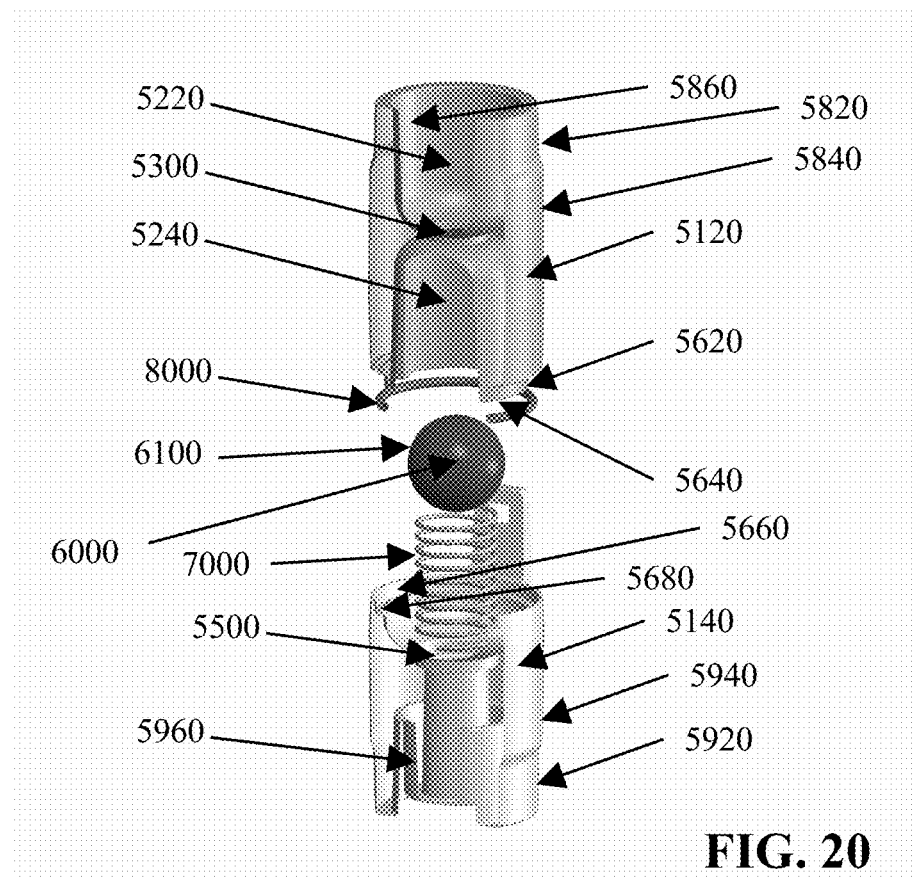
FIG. 20 is a top perspective assembly cross-section view, taken at section B-B, of an exemplary embodiment of a trap 5000.
Figure 21:
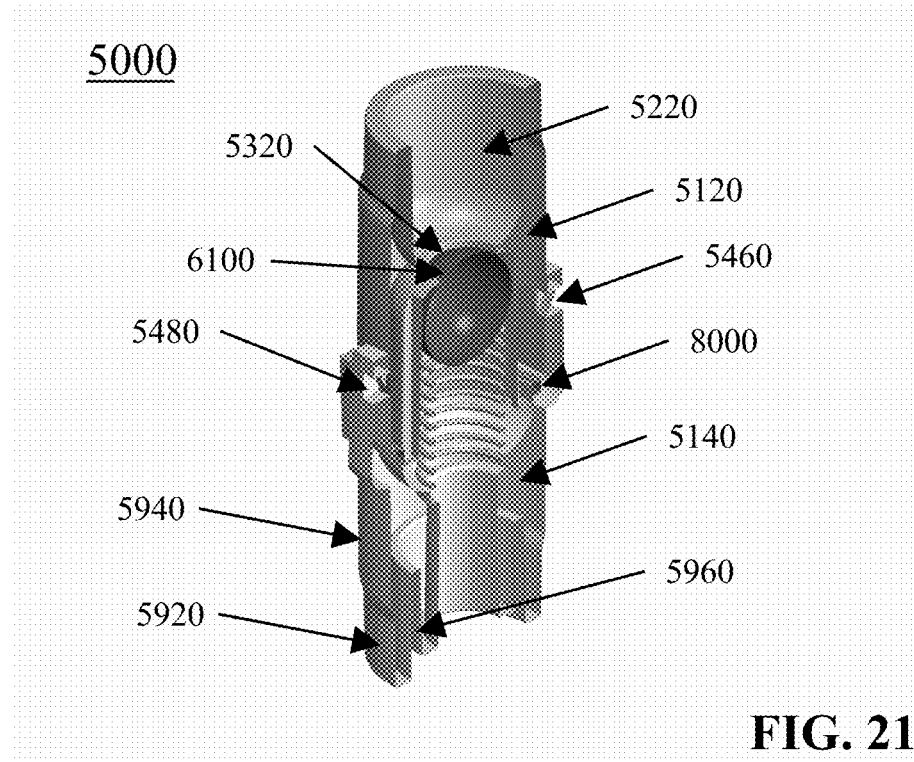
FIG. 21 is a top perspective assembly cross-section view, taken at section C-C, of an exemplary embodiment of a trap 5000.
Figure 22:
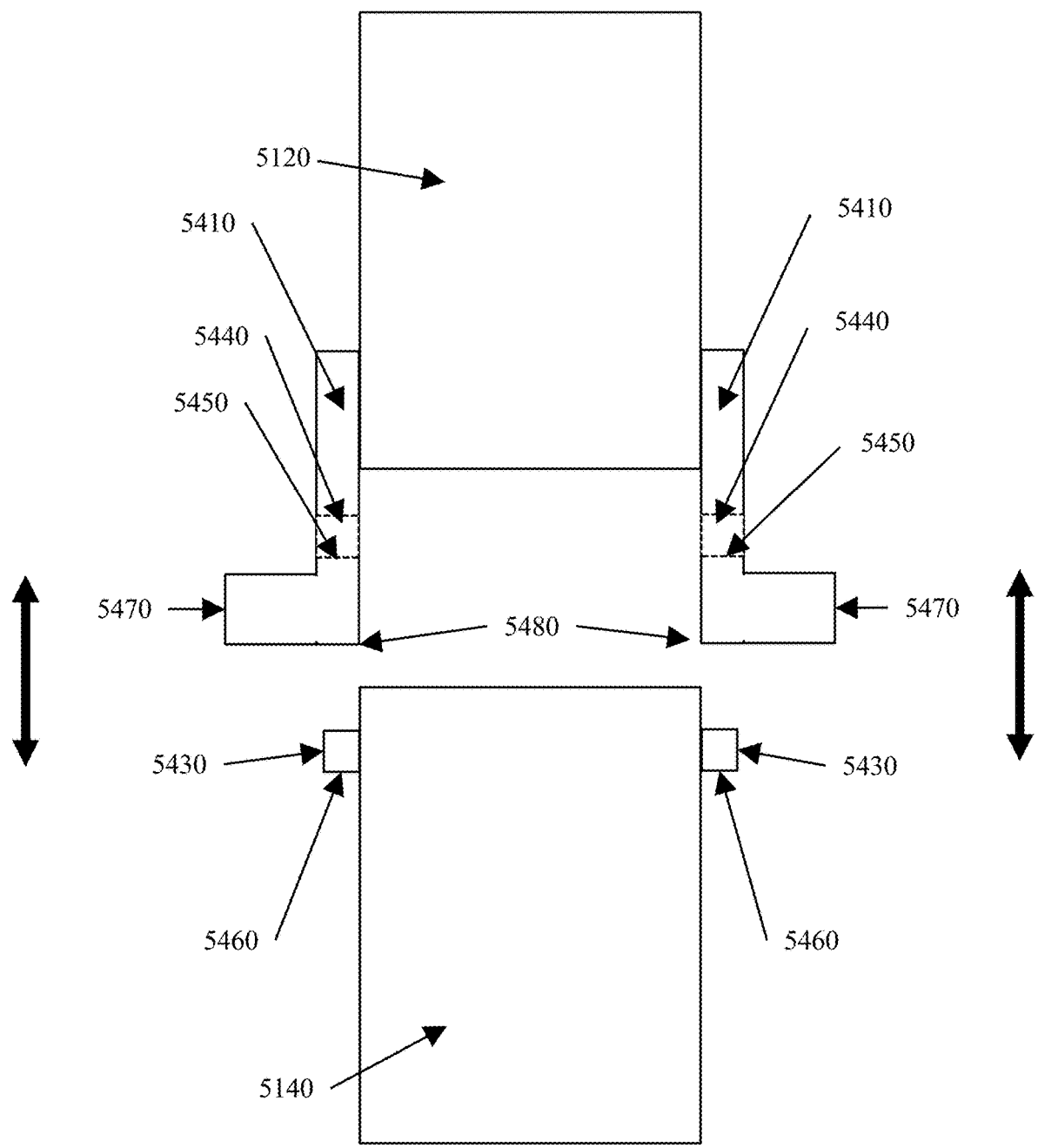
FIG. 22 is a side view of an exemplary embodiment of a trap housing 5100.
Figure 23:
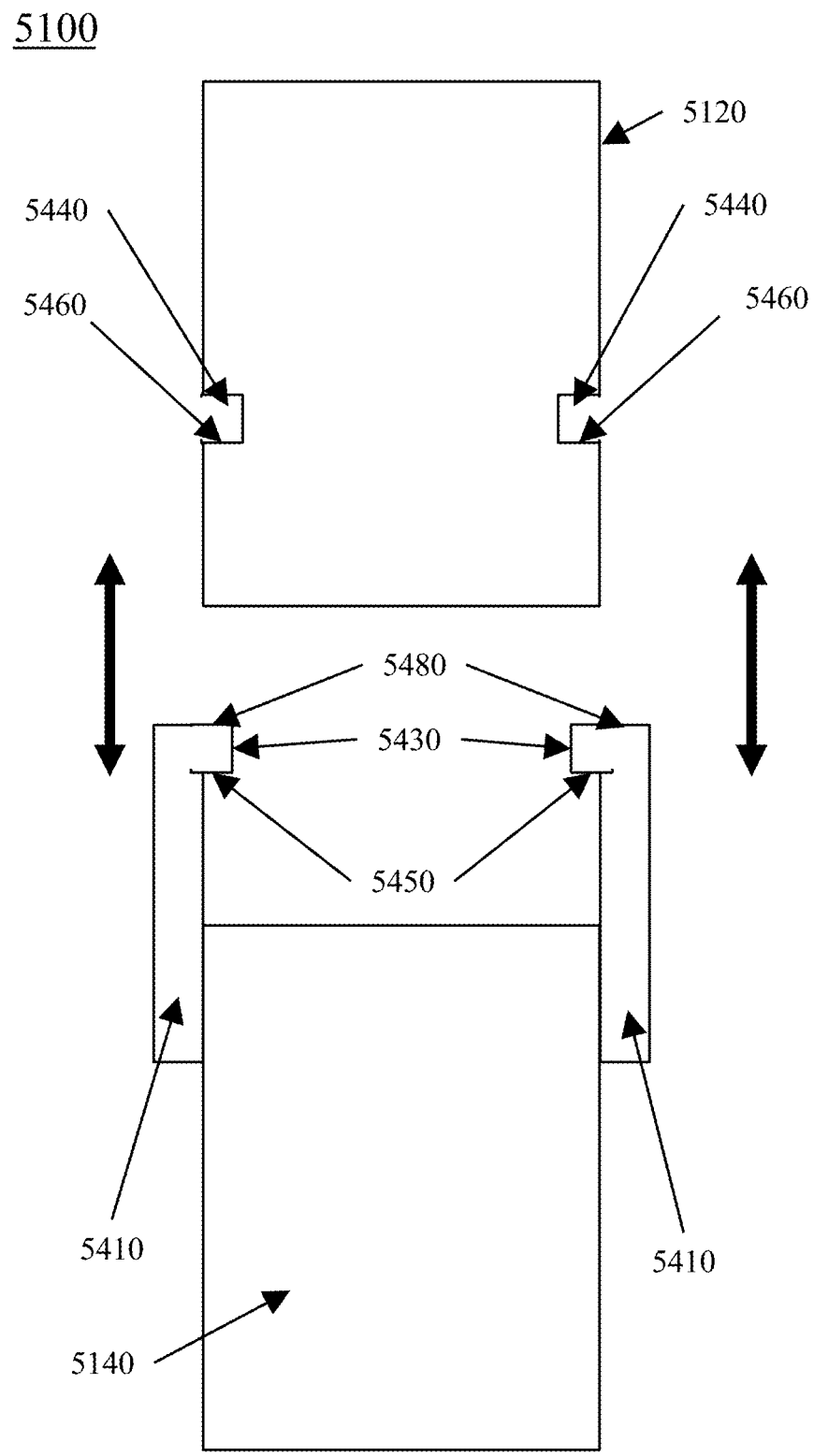
FIG. 23 is a side view of an exemplary embodiment of a trap housing 5100.

Referring to the various views of FIGS. 1-23, certain exemplary embodiments of a condensate management system 1000, which can include a condensate producing unit 2000, a condensate supply conduit 3000, a condensate drain conduit 4000, and/or a automatic condensate release device (or "trap") 5000. In certain exemplary embodiments, trap 5000 can include an elongate trap housing 5100 that can be defined by a first housing portion 5120 and a second housing portion 5140. In certain exemplary embodiments, housing 5000 and/or first housing portion 5120 can be substantially hollow and/or can define a substantially cylindrical reservoir 5220 that can operatively store condensate and/or a can define a substantially cylindrical chamber 5240 that can operatively surround and/or contain a valve 6000 within trap 5000. In certain exemplary embodiments, valve 6000 can define a valve wall that defines a substantially hollow valve interior. In certain exemplary embodiments, valve 6000 can define a substantially spherical, hemispherical, curved, bulging, and/or convex outer valve surface 6100, that can be operatively biased, such as via a helical spring 7000, towards a valve seat 5320 located at a substantially circular release port 5300 that operatively fluidically connects reservoir 5220 with chamber 5240. In certain exemplary embodiments, spring 7000, which can bear upon, seat, and/or be attached to second housing portion 5140 at spring seat 5500, can operatively bear against valve 6000 and/or valve outer surface 6100. In certain exemplary embodiments, spring 7000 can be preloaded sufficiently to cause valve outer surface 6100 to be operatively sealingly engaged with valve seat 5320. Once a sufficient condensate builds up in reservoir 5220, the fluidic force applied on valve 6000, due to the built up condensate and the pressure of the conditioned air against that condensate, can overcome the spring force applied by spring 7000 against valve 6000, thereby pushing valve 6000 and/or valve outer surface 6100 away from valve seat 5320 so that condensate can escape reservoir 5220 and into chamber 5240, from which the condensate can flow by gravity out of housing 5100 and into condensate drain conduit 4000. When the level of the condensate in reservoir 5220 drops sufficiently, the spring force provided by spring 7000 can overcome the fluidic force, and thereby again push valve 6000 and/or valve outer surface 6100 against valve seat 5320, which can again form a seal that substantially prevents condensate and/or conditioned air from escaping reservoir 5220 into chamber 4240 and/or prevents drain air from traveling from condensate drain conduit 4000, through trap 5000, and into condensate supply conduit 3000 and/or into condensate producing unit 2000.

In certain exemplary embodiments, one or more valve guides 5340, which can be defined by second housing portion 5140, can urge valve 6000 to move along the longitudinal axis L-L of housing 5100, which can be coincident with longitudinal axis H-H of spring 7000, thereby ensuring valve 6000 and/or valve outer surface 6100 seats properly against valve seat 5320 to form a substantial hydraulic and/or pneumatic seal.

In certain exemplary embodiments, housing 5100 can define and/or be integral with a lock 5400 that can operably secure first housing portion 5120 to second housing portion 5140, which can prevent condensate from escaping trap 5000 except into drain conduit 4000. In certain exemplary embodiments, to e.g., distribute locking forces circumferentially around longitudinal axis L-L (which can better ensure a hydraulic seal between first housing portion 5120 and second housing portion 5140), lock 5400 can comprise one or more sub-locks, each defining and/or be integral with a first locking surface 5450 and a second locking surface 5460. In certain exemplary embodiments, to e.g., allow reusability and/or to ensure and/or communicate the formation of a reliable seal, first locking surface 5450 can be configured to operably non-destructively releasably, clickably, lockingly engage with second locking surface 5460, such that, when engaged, first locking surface 5450 contacts, bears on, opposes, and/or extends substantially parallel to, its corresponding second locking surface 5460. In certain exemplary embodiments, a sub-lock can comprise, e.g., an elongate arm 5410 having shape memory, which can allow for non-destructively releasable re-use of the sub-lock. Any arm 5410 can be associated with (e.g., defined by, formed by, attached to, and/or integral with) either first housing portion 5120 or second housing portion 5140. Any arm 5410 can be associated with (e.g., defined by, formed by, attached to, and/or integral with), e.g., a hook 5430 (such as a protrusion, ledge, and/or indentation) at its end, where hook 5430 can be associated with (e.g., defined by, formed by, attached to, and/or integral with) first locking surface 5450. In certain exemplary embodiments, the sub-lock can comprise, e.g., a catch 5440 (such as a protrusion, ledge, and/or indentation) that can be associated with (e.g., defined by, formed by, attached to, and/or integral with) and/or extend from (or into) the other housing portion, where catch 5440 is associated with (e.g., defined by, formed by, attached to, and/or integral with) second locking surface 5460. Thus, any arm 5410 can be associated with either a hook 5430 or its corresponding catch 5440, the hook and catch configured to non-destructively releasably, repeatedly, manually engage, interlock, and/or cooperate to help connect, attach, seal, lock, and/or secure first housing portion 5120 to second housing portion 5140.

In certain exemplary embodiments, for each arm 5410, housing 5100 can be associated with (e.g., defined by, formed by, attached to, and/or integral with) an arm guide 5420. If a given arm 5410 is associated with first housing portion 5120, its arm guide 5420 will be associated with second housing portion 5140, and vice versa. In certain exemplary embodiments, when first housing portion 5120 and second housing portion 5140 are separated, yet are moved toward one another along the housing longitudinal axis to close and/or form housing 5100, each arm guide 5420 can direct, guide, and/or bias its corresponding arm 5410 so that the corresponding first locking surface 5450 eventually non-destructively releasably, clickably, lockingly engages with the corresponding second locking surface 5460 to help connect, attach, seal, lock, and/or secure first housing portion 5120 to second housing portion 5140.

In certain exemplary embodiments, a given first locking surface 5450 can be disengaged, unsecured, and/or unlocked from its corresponding second locking surface 5460 by gently prying the end 5480 of its corresponding arm 5410 radially away from housing longitudinal axis L-L, such as by inserting a flat bladed screwdriver between arm 5410 and housing 5100 and urging end 5480 of arm 5410 away from housing 5100. In certain exemplary embodiments, any arm 5410 can define an arm grip 5470, such as near arm end 5480, via which a person can grasp arm 5410 to pull its end 5480 radially away from housing longitudinal axis L-L (rather than or in addition to using a screwdriver to pry arm 5410 away from housing 5100).

In certain exemplary embodiments, first housing portion 5120 can define one or more hooks 5430, such as a protrusion. In certain exemplary embodiments, second housing portion 5140 can define one, two, three, four, five, six, or more longitudinally extending arms 5410, any of which can define at some point along its length, such as near a terminal end 5480 of arm 5420, a catch 5440 (which can be an opening, cavity, groove, protrusion, indentation, etc.) therein and/or thereon. Because any arm 5410 can exhibit shape memory, in certain exemplary embodiments catch 5440 can non-destructively clickably engage with and/or in its corresponding hook 5430 to non-destructively releasably connect, attach, seal, lock, and/or secure first housing portion 5120 to second housing portion 5140. To release hook 5430 from catch 5440, the corresponding arm 5410 can be urged radially away from axis L-L via, e.g., by pulling arm 5410 with a fingertip or fingernail, prying with a flat-bladed screendriver, pinching arm grip 5470 with thumb and forefinger and pulling, etc. Due to its shape memory, that arm 5410 can return to approximately its original position once the urging action ceases, thereby allowing arm 5410 to repeatedly connect, attach, seal, lock, and/or secure first housing portion 5120 to second housing portion 5140.

In certain exemplary embodiments, an O-ring 8000 (potentially lubricated with a silicon lubricant) can allow first housing portion 5120 to form a circumferential and/or compressive seal with second housing portion 5140, which can prevent condensate and/or gas from leaking out of (or into) housing 5100 (other than any condensate the operatively drains into drain conduit 4000). For example, first housing portion 5120 can define a first circumferential housing sealing surface 5620 and/or a first compressive housing sealing surface 5640, each of which can bear against O-ring 8000 to help seal housing 5100. Likewise, second housing portion 5120 can define a second circumferential housing sealing surface 5660 and/or a second compressive housing sealing surface 5680, each of which can bear against O-ring 8000 to help hydraulically and/or pneumatically seal housing 5100.

At the installer's option, in certain exemplary embodiments trap 5000 can be connected to condensate supply conduit 3000 via any of several different size and/or types of pipe fittings, hose fittings, pipes, and/or hoses, such as a metric 20 mm PVC pipe or pipe fitting that forms a solvent-welded seal in conjunction with first inlet circumferential fluidic sealing surface 5820, a ¾ inch schedule 40 PVC pipe or pipe fitting that forms a solvent-welded seal in conjunction with second inlet circumferential fluidic sealing surface 5840, or a ⅝" internal diameter flexible mini-split hose that forms a taped and/or force fit circumferential seal in conjunction with third inlet circumferential fluidic sealing surface 5860.

Likewise, at the installer's option, in certain exemplary embodiments trap 5000 can be connected to condensate drain conduit 4000 via any of several different size and/or types of pipe fittings, hose fittings, pipes, and/or hoses, such as a metric 20 mm PVC pipe or pipe fitting that forms a solvent-welded circumferential seal in conjunction with first outlet circumferential fluidic sealing surface 5920, a ¾ inch schedule 40 PVC pipe or pipe fitting that forms a solvent-welded circumferential seal in conjunction with second outlet circumferential fluidic sealing surface 5940, or a ⅝" internal diameter flexible mini-split hose that forms a force fit circumferential seal in conjunction with third outlet circumferential fluidic sealing surface 5960.

In certain exemplary embodiments, trap 5000 can:

Operate properly at any pressure from, e.g., plus 0.5 inch to minus 0.5 inch WC of pressure within unit drain pan in which the condensate is gathered prior to delivery to the trap;

Installer-selectably connect, at either or both ends, to a nominal ¾ inch schedule 40 PVC pipe fitting, a nominal metric 20 mm PVC pipe fitting, or a nominal ⅝" I.D. flexible mini-split hose;

Be configured with its spring preloaded to approximately 0.75 inches WC when the fan is not in operation to prevent insects and/or air infiltration and/or exfiltration from occurring within the condensate drain conduit;

Be configured such that the valve can remain pressed against its seat, built into the first housing portion, by the spring when the fan is not in operation and the height of any column of condensate above the valve is 0.75 inches or less (e.g., if the fan is operating to generate an air pressure of negative 0.5 inches WC immediately upstream of the condensate in the reservoir, that condensate can reach a height of 1.25 inches before spring force will be overcome such that the valve will leave its seat and thereby begin to open so that condensate can exit the reservoir and flow into the chamber and out of the trap into the drain conduit, and e.g., if the fan is operating to generate an air pressure of positive 0.5 inches WC immediately upstream of the condensate in the reservoir, that condensate can reach a height of 0.25 inches before spring force will be overcome such that the valve will leave its seat and thereby begin to open so that condensate can exit the reservoir and flow into the chamber and out of the trap into the drain conduit);

Utilize a housing formed of a clear material, such as PVC plastic, so that the interior (i.e., valve, spring, reservoir and/or chamber) can be viewed to determine if cleaning or service is necessary;

Be easily opened for cleaning or service by prying the arms away from the protrusions with a small flat head screwdriver;

Have a maximum outer diameter that is approximately equal to the outside diameter of a ¾-inch schedule 40 PVC pipe (1.05 inches);

Be installed and operated when the housing's longitudinal axis is oriented within approximately +/−15 degrees of vertical.

Be configured such that its O-ring relies on a combination of circumferential and compressive housing surfaces to assure that a circumferential seal formed thereby does not leak when either tension or torque is applied to the joint formed thereby, i.e., the O-ring can snugly slip over an first circumferential housing sealing surface defined by the first housing portion and as the second housing portion is forced toward the O-ring, the first housing portion and the second housing portion can clip, click, connect, attach, seal, lock, and/or secure in place, thus compressing and squeezing the O-ring into a sealing configuration;

Be constructed from a housing made from PVC, a valve made from polyethylene, a spring made from 300 series stainless steel, and/or an O-ring made from Viton.

Comprise a plurality (e.g., two, three, four, etc.) guides to ensure that the valve aligns with the seat; and/or Be configured such that the first and second housing portions are symmetrical so that the hooks align with the catches even after rotating one housing portion 180 degrees with respect to the other.

In certain exemplary embodiments, trap 5100 can be, e.g., glued, solvent welded, friction fit, and/or threaded into condensate supply conduit 3000 and/or condensate drain conduit 4000.

Any portion and/or component of housing 5100 can be formed by extrusion, casting, transfer molding, blow-molding, injection-molding, thermosetting, thermoforming, stamping, coating, depositing, curing, vacuum forming, milling, machining, cutting, etching, lithographic printing, joining, 3-D printing, and/or additive manufacturing, etc. Any portion and/or component of trap 5000 can have any level of opacity, where a low level of opacity for housing 5100 can allow condensate and/or debris within trap 5000 to be observed, while a high level of opacity can hide them.

Thus, certain exemplary embodiments can provide a trap 5000 that is configured to operate dry when the condensate-producing unit is not operating, and when the condensate-producing unit is operating to allow condensate to flow from the points of condensate generation within the unit, without substantial impediment through trap 5000, and to a drain, while simultaneously not allowing a substantial quantity of gases to flow through trap 5000.

Certain exemplary embodiments can provide an automatic condensate release device configured to operably selectively release condensate received from a condensate-producing unit, the automatic condensate release device comprising:
  a substantially spherical valve that defines a valve outer surface;
  an elongate housing defining:
    a condensate reservoir;
    a valve chamber configured to operably contain the valve; and
    a condensate release port configured to operably convey condensate from the condensate reservoir into the valve chamber;
    a valve seat configured to, when in contact with the valve outer surface, operably form a fluidic seal of the condensate release port; and
  a helical spring located substantially within the valve chamber and configured to operably bias the valve toward the valve seat;
  wherein:
    the housing defines a longitudinal housing axis, a first housing portion, and a second housing portion;
    the housing defines a lock configured to operably secure the first housing portion to the second housing portion, the lock comprising:
      at least two elongate arms that have shape memory, each arm defining a first locking surface; and
      a second locking surface, wherein the first locking surface is configured to operably non-destructively releasably, clickably, lockingly engage with the second locking surface, such that each first locking surface contacts, bears on, opposes, and/or extends substantially parallel to, its second locking surface;
    for each arm, the housing defines one or more arm guides configured to, when the first locking surface is not engaged with its corresponding second locking surface, operably slidably direct the arm until the first locking surface non-destructively releasably, clickably, lockingly engages with the corresponding second locking surface; and
    the first housing portion and the second housing portion cooperate with an O-ring to compressively fluidically seal the housing and circumferentially fluidically seal the housing when each first locking surface is operably non-destructively releasably, clickably, lockingly engaged with its corresponding second locking surface;
    the housing defines a spring seat configured to operably anchor the helical spring to the housing;
    the valve chamber defines at least one valve guide configured to operably slidably direct the valve toward and away from the valve seat along the longitudinal housing axis;
    the spring defines a longitudinal helix axis that is co-axial with the longitudinal housing axis;
    in an operable configuration, the spring is pre-loaded to approximately 0.75 inches water column (0.027 psi);
    the automatic condensate release device is configured to operably release condensate toward a drain conduit while allowing substantially no air below the valve seat and within the automatic condensate release device to flow toward the condensate-producing unit and substantially no air above the valve seat and within the automatic condensate release device to flow into the drain conduit, provided that the air above the valve seat is pressurized, relative to air contacting yet outside the automatic condensate release device, between approximately negative 2 inches water column and approximately positive 0.625 inches water column;
    the housing is configured to operatively form an inlet circumferential fluidic seal formed between a selectable one of:
      a first inlet connection surface and a 20 mm (nominal internal diameter) PVC pipe or pipe fitting;
      a second inlet connection surface and a 0.75 inch (nominal internal diameter) schedule 40 PVC pipe or pipe fitting; and
      a third inlet connection surface and a 0.625 inch (nominal internal diameter) flexible mini-split hose;
    the housing is configured to operatively form an inlet circumferential fluidic seal formed between a selectable one of:
      a first outlet connection surface and a 20 mm (nominal internal diameter) PVC pipe or pipe fitting;
      a second outlet connection surface and a 0.75 inch (nominal internal diameter) schedule 40 PVC pipe or pipe fitting; and
      a third outlet connection surface and a 0.625 inch (nominal internal diameter) flexible mini-split hose;
    the automatic condensate release device is operable when the longitudinal housing axis is oriented within approximately 45 degrees of vertical;
    the housing is formed from a substantially clear material;
    the first housing portion is configured to non-destructively disconnect from the second housing portion without rotation of the first housing portion relative to the second housing portion about the longitudinal housing axis;
    the automatic condensate release device is fluidically connected to the condensate-producing unit via a condensate conduit and the automatic condensate release device is fluidically connected to a condensate drain via a drain conduit; and/or
    the first housing portion is configured to non-destructively disconnect from the second housing portion without disconnection of the automatic condensate release device from the condensate conduit or the drain conduit.

Certain exemplary embodiments can provide a condensate management system comprising the automatic condensate release device described in the paragraph immediately above.

Certain exemplary embodiments can provide a system comprising:
- a condensate-producing unit; and
- the automatic condensate release device described two paragraphs above;

wherein:
- the condensate-producing unit is fluidically connected to the automatic condensate release device.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—at a higher level.
accumulate—to amass, collect, gather and/or become gathered together in an increasing quantity.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
adjacent—close to; lying near; next to; adjoining, and/or within a horizontal radius of approximately 0 to approximately 0.25 inches of, including all values and subranges therebetween.
after—following in time and/or subsequent to.
against—in contact with so as to rest and/or press on, so as to come into forcible contact with, and/or contrary to and/or in a direction and/or course opposite to.
air—the earth's atmospheric gas.
allow—to provide, let do, happen, and/or permit.
along—through, on, beside, over, in line with, and/or parallel to the length and/or direction of; and/or from one end to the other of
amount—a quantity.
an—at least one.
anchor—to hold, fix, and/or secure.
and—in conjunction with.
and/or—either in conjunction with or in alternative to.
annular—shaped like a ring.
any—one, some, every, and/or all without specification.
apparatus—an appliance or device for a particular purpose.
approximately—about and/or nearly the same as.
are—to exist.
arm—an elongated structural member, which need not be solely linear.
around—about, surrounding, and/or on substantially all sides of; and/or approximately.
as long as—if and/or since.
associate—to join, connect together, and/or relate.
at—in, on, and/or near.
at least—not less than, and possibly more than.
at least one—not less than one, and possibly more than one.
atmospheric pressure—the pressure exerted by the earth's atmosphere at any given point, being the product of the mass of the atmospheric column of the unit area above the given point and of the gravitational acceleration at the given point; typically approximately 14.7 psia.
attach—to fasten, secure, couple, and/or join.
automatic—performed via a device in a manner essentially independent of influence and/or control by a user.
avoid—to resist and/or try to prevent from happening.
away—on a path directed from a predetermined location.
axis—a straight line about which a body and/or geometric object rotates and/or can be conceived to rotate and/or a center line to which parts of a structure and/or body can be referred.
back—that portion and/or side that is opposite and/or behind the front.
ball—a substantially spherical object.
based on—indicating one or more factors that affect a determination, but not necessarily foreclosing additional factors that might affect that determination.
bear—to support, hold up, and/or press upon.
below—beneath; in a lower place; and/or less than.
between—in a separating interval and/or intermediate to.
bias—n. a tension and/or force; v. to urge and/or force.
block—(n) an obstacle and/or the act of blocking; (v) to obstruct, stop and/or or impede the passage of and/or movement through; obstruct, and/or to prevent from happening, succeeding, and/or progressing. body—a main and/or central part. bottom—opposite of top and/or a lowest part of an object relative to a point of reference, the object in a predetermined orientation relative to the point of reference.
buoyancy—the ability to float in a liquid and/or to rise in a fluid; and/or the upward force that a fluid exerts on an object less dense than itself that is at least partly immersed in the fluid.
buoyant—having and/or marked by buoyancy.
by—via and/or with the use and/or help of
can—is capable of, in at least some embodiments.
cause—to bring about, provoke, precipitate, produce, elicit, be the reason for, result in, and/or effect.
cease—to halt and/or stop.
center of mass—the average position of all the parts of an object or system, weighted according to their masses and/or the unique position at which the weighted position vectors of all the parts of the object or system sum up to zero.
central—situated at, in, or near the center of a length.
centroid—the "centroid" or geometric center of a plane figure is the arithmetic mean position of all the points in the figure. The "centroid" of a ring or a bowl, for example, lies in the object's central void.
chamber—a space and/or compartment that is substantially or at least partially defined and surrounded by one or more objects.
chamber-facing—having a surface that defines, is in contact with, and/or is adjacent to a chamber.

circular—having a cross-section of a circle and/or substantially resembling a round shape.
circumferential—of, at, around, and/or near the circumference; surrounding; lying along the outskirts.
clean-out—an access for inspecting, reaching, and/or removing obstructions, debris, and/or contaminants; and/or a pipe fitting containing a removable plug that provides access for inspection and/or cleaning of the pipe run.
clear—substantially transparent and/or easily seen through.
clickably—in a manner that can and/or will produce a clicking sound and/or vibration.
closable—able to be repeatedly closed.
close—to alter and/or move an object so that an opening and/or or passage is covered and/or obstructed by the object; to shut; and/or to draw and/or bind together.
coaxial—having and/or mounted on a common axis.
collect—to gather, accumulate, and/or bring together in a group or mass.
collection—an accumulation and/or the act or process of collecting.
combustion—the chemical action resulting from the direct combination of oxygen gas, generally in air, with a combustible material accompanied by the evolution of heat and light.
composition of matter—a combination, reaction product, compound, mixture, formulation, material, and/or composite formed by a human and/or automation from two or more substances and/or elements.
compress—tending to press, squeeze together, and/or compact into less space; condense.
compressively—serving to, able to, and/or having the power and/or capacity to compress.
comprising—including but not limited to, what follows.
conceive—to imagine, conceptualize, form, and/or develop in the mind.
condensate—water, an aqueous solution, and/or a liquid, that liquid resulting from condensation of a gas.
condensate producing unit—a machine, assembly, apparatus, and/or system that produces condensate. Examples include furnaces, air conditioners, heat pumps, chillers, ice-makers, and dehumidifiers.
conduit—a tube, pipe, channel, and/or duct.
configure—to design, arrange, set up, shape, and/or make suitable and/or fit for a specific purpose, function, use, and/or situation.
configured to—having a structure that, during operation, will perform the indicated activity(ies). To the extent relevant to the current application, the use of "configured to" is expressly not intended to invoke 35 U.S.C. § 112(f) for that structure.
connect—to join or fasten together.
connection—something that physically connects, joins, unites, links, and/or bonds two or more elements of a system.
constrain—toconfine, limit, inhibit and/or keep within certain limits.
contact—to physically come together and/or touch, as of objects and/or surfaces.
contain—to store, restrain, hold, and/or keep within limits.
containment—the act of containing, keeping from spreading, and/or directing the flow, motion, and/or spread of.
convert—to transform, adapt, and/or change.

convex—having a surface and/or boundary that curves and/or bulges outward, as the exterior of a sphere; and/or a surface such that for any pair of points on the surface, any point on the straight line segment that joins the pair of points is under the object.
convey—to transmit, transport, guide, and/or carry.
cooperate—to work and/or act together and/or jointly for a common purpose and/or benefit.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
coupling—linking in some fashion.
cover—(n) a substantially planar object configured to protect and/or conceal; (v) to overlay, place upon and/or over.
create—to bring into being.
debris—a solid substance and/or the remains of something destroyed, disintegrated, and/or decayed.
define—to establish the meaning, relationship, outline, form, and/or structure of; and/or to precisely and/or distinctly describe and/or specify.
degree—a unit of angular measure equal in magnitude to 1/360 of a complete revolution in a predetermined plane.
derive—to receive, obtain, and/or produce from a source and/or origin.
deter—to hamper, hinder, delay, interrupt, interfere, oppose, restrict, retard, impede, stop, and/or prevent from doing, acting, happening, and/or progressing.
determine—to find out, obtain, calculate, decide, deduce, ascertain, and/or come to a decision, typically by investigation, reasoning, and/or calculation.
device—a machine, manufacture, and/or collection thereof
diameter—a length of a straight line segment passing through a center of an object and terminating at the periphery thereof.
difference—a value obtained via a subtraction of a first quantity from a second quantity.
direct—to point, aim, control, cause, provide instruction to, send toward a place and/or object, and/or cause to move in or follow a predetermined course.
direction—a spatial relation between something and a course along which it points and/or moves; a distance independent relationship between two points in space that specifies the position of either with respect to the other; and/or a relationship by which the alignment and/or orientation of any position with respect to any other position is established.
disconnect—to sever, unattach, and/or interrupt a connection.
distance—a measure of physical and/or logical separation.
downward—directed toward a lower place and/or position.
drain—(n) a pipe and/or channel that carries off water, liquid, slurry, waste, sewage, etc.; (v) to empty, cause liquid to go out from, draw off (a liquid) by a gradual process, and/or become empty by the drawing off of liquid.
during—at some time in a time interval.
each—every one of a group considered individually.
effective—sufficient to bring about, provoke, elicit, and/or cause.

ellipsoid—a geometric surface, all of whose plane sections are ellipses (note that a circle is a special case of an ellipse); and/or a solid having such a shape.

elongate—appearing to be drawn out, spatially longer, and/or longer than wide.

elongated—drawn out, made spatially longer, and/or having more length than width.

embodiment—an implementation, manifestation, and/or concrete representation.

engage—to mesh, mate, connect, and/or interlock and/or to contact, cause to contact, interact, and/or cause to interact.

engaged—to become meshed or interlocked.

enter—to come and/or flow into.

estimate—(n) a calculated value approximating an actual value; (v) to calculate and/or determine approximately and/or tentatively.

exemplary—serving as an example, instance, and/or illustration.

exit—(n) a path, passage, and/or way leading through an opening and away from an interior of a container; (v) to leave, go away, and/or flow out of.

extend—to move out and/or away from; to exist and/or be locate, placed, and/or stretched lengthwise; to reach spatially outward.

exterior—a region that is outside of a device and/or system.

extrude—to shape (a plastic, for instance) by forcing it through a die.

first—a label for a referenced element in one or more patent claims, but that label does not necessarily imply any type of ordering to how that element (or any other elements of a similar type) is implemented in embodiments of the claimed subject matter.

fitting—a device used in pipe and/or plumbing systems to connect, join, and/or couple straight sections of pipe and/or tube, adapt to different sizes and/or shapes of piping and/or tubing, and/or to connect desired components into a system that allows for the conveyance of water, gas, and/or liquid.

flexible—capable of bending without a tendency to break; pliable.

float—(n) a buoyant object; (v) to cause to and/or to remain suspended within and/or on the surface of a fluid without sinking.

flow—(n) the act of flowing, a continuous transfer, and/or a stream and/or current; (v) to pour forth, issue in a stream, and/or move and/or run smoothly with unbroken continuity, as in the manner characteristic of a fluid.

flowrate—a measure how much flows over a given time period.

fluid—a liquid, slurry, vapor, mist, cloud, plume, and/or foam, etc.

fluidic—of, relating to, or characteristic of a fluid.

for—with a purpose of.

force—a capacity to do work and/or cause physical change; a dynamic influence that changes a body from a state of rest to one of motion or changes its rate of motion, where the magnitude of the force is equal to the product of the mass of the body and its acceleration; and/or a static influence that produces an elastic strain in a body or system or bears weight.

form—(v) to construct, build, generate, and/or create; (n) a phase, structure, and/or appearance.

fourth—a label for an element in one or more patent claims, the element other than a "first" or "second" or "third" referenced element of a similar type, but the label does not necessarily imply any type of ordering to how that "fourth" element is implemented in embodiments of the claimed subject matter.

from—used to indicate a source, origin, and/or location thereof.

front—that portion and/or side that is forward, prominent, and/or most often seen and/or used.

function—to perform as designed when applied.

furnace—a chamber, enclosure, or other holding means for heating materials therein.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container.

generate—to create, produce, give rise to, and/or bring into existence.

given—stated, fixed, and/or specified.

greater—larger and/or more than.

guide—to direct, steer, and/or exert control and/or influence over; and/or a passive structure configured to direct, resist, and/or prevent the movement of something.

have—to possess and/or contain as a characteristic, quality, function, and/or constituent part.

having—including but not limited to.

height—a measurement of the extent of something along an, often substantially vertical, dimension.

helical spring—a wound (typically metallic) coil adapted to be elastically compressed and/or expanded.

horizontal—parallel to and/or in the plane of the horizon.

hose—a flexible tube for conveying a liquid, as water, to a desired point.

housing—something that covers, encloses, protects, holds, and/or supports, such as a frame, box, and/or chassis.

inch—a unit of linear measurement in the English system equal to approximately 2.54 cm.

including—including but not limited to.

initialize—to prepare something for use and/or some future event.

inlet—an intake and/or entrance.

inner—closer than another to the center and/or middle.

install—to connect or set in position and prepare for use.

integral—formed and/or united into another entity.

internal—of, relating to, and/or located inside and/or within the limits and/or surface.

intersecting—meeting at a point and/or cutting across and/or through.

into—toward, in the direction of, and/or to the inside of.

is—to exist in actuality.

its—of, belonging to, or associated in some way with a referenced thing.

left—opposite of right and/or of and/or designating the side of something and/or someone that faces west when the front is turned towards the north.

length—a longest dimension of something and/or the measurement of the extent of something along its greatest dimension.

less than—having a measurably smaller magnitude and/or degree as compared to something else.

level—a relative position on a scale and/or a position along a vertical axis indicating height and/or depth.

located—situated approximately in a particular spot and/or position.

locking—configured to fix in place, hold, entangle, and/or interlock securely.

lockingly—in a manner that locks, fixes in place, holdss, entangle, and/or interlocks securely.

longitudinal axis—a straight line defined parallel to an object's length and passing through a centroid of the object.

lower—in a position below something else and/or lesser in elevation in relation to something else.

management—the act of directing and/or exerting control and/or influence over.

material—the substance or substances out of which a thing is and/or can be made.

mating—one of a matched pair.

may—is allowed and/or permitted to, in at least some embodiments.

measured—determined, as a dimension, quantification, and/or capacity, etc. by observation.

method—one or more acts that are performed upon subject matter to be transformed to a different state or thing and/or are tied to a particular apparatus, said one or more acts not a fundamental principal and not pre-empting all uses of a fundamental principal.

mini-split—a ductless air conditioner, heat pump, and/or heater.

more—a quantifier meaning greater in size, amount, extent, and/or degree.

movement—a change in place and/or position from one location to another.

near—a distance of less than approximately [X].

negative—less than zero and/or at a pressure less than atmospheric.

no—an absence of and/or lacking any.

nominal—a title by which a thing is known and/or designated.

non-destructively—of, relating to, or being a process that does not result in damage to the subject material and/or product and/or results in such minimal damage that the subject material and/or product can be re-used for its intended purpose.

not—a negation of something.

O-ring—a ring of pliable material, as rubber or neoprene, used as a gasket.

one—being and/or amounting to a single unit, individual, and/or entire thing, item, and/or object.

open—(v) to interrupt, to release from a closed and/or fastened position, to remove obstructions from, to clear, and/or to electrically decouple in a manner to create a gap across which electrical energy cannot readily flow; (adj) not substantially obstructed and/or not closed.

openable—able to be opened.

opening—an open space serving as an aperture, passage, or gap.

operable—practicable and/or fit, ready, and/or configured to be put into its intended use and/or service.

operably—when operating and/or in effect for its intended use and/or service.

operating—in its intended use and/or service.

operative—when in operation for its intended use and/or service.

oppose—to be placed and/or located opposite, in contrast, in counterbalance, and/or across from something else and/or from each other.

or—a conjunction used to indicate alternatives, typically appearing only before the last item in a group of alternative items.

orient—to position a first object relative to a second object.

orthogonal—perpendicular and/or at a right angle to.

other—a different and/or distinct entity and/or not the same as already mentioned and/or implied.

out—in a direction away from the inside, center, and/or middle, such as a container and/or source.

outer—farther than another from the center and/or middle.

outlet—a passage for escape and/or exit; a vent.

outside—beyond a range, boundary, and/or limit; and/or not within.

overall—total, combined, and/or cumulative effect.

parallel—of, relating to, and/or designating lines, curves, planes, and/or surfaces everywhere equidistant.

part—a component.

passes—runs and/or extends.

per—for each and/or by means of.

permanently—lasting and/or remaining without essential change in status, condition, and/or place.

perpendicular—intersecting at or forming substantially right angles; and/or substantially at a right angle with respect to an axis; and/or of, relating to, or designating two or more straight coplanar lines or planes that intersect at approximately a right angle.

pipe—a hollow cylinder and/or tube used to conduct a liquid, gas, and/or finely divided solid.

pivot—(v) to rotate, revolve, and/or turn; (n) the act of turning on a pivot and/or a short rod or shaft on which a related part rotates and/or or swings.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.

port—an opening for the insertion and/or passage of an object and/or fluid.

portion—a part, component, section, percentage, ratio, and/or quantity that is less than a larger whole.

positive—greater than zero and/or at a pressure greater than atmospheric.

pre-—a prefix that precedes an activity that has occurred beforehand and/or in advance.

pre-loaded—loaded, compressed, expanded, and/or having a force applied before use, such as a helical spring compressed and/or expanded (with respect to its undeformed state) to create an expansive and/or compressive force acting at the ends of the spring and along the longitudinal axis of the spring.

predetermine—to determine, decide, and/or establish in advance.

present—existing.

pressure—a measure of force applied uniformly over a surface.

pressurize—to increase pressure on a fluid, typically above normal and/or ambient.

prevent—to impede, resist, hinder, avert, deter, stop, and/or keep from happening.

prior—before and/or preceding in time or order.

probability—a quantitative representation of a likelihood of an occurrence.

product—something produced by human and/or mechanical effort.

project—to calculate, estimate, or predict.

provide—to furnish, supply, give, and/or make available.

psi—pounds per square inch.

PVC—polyvinyl chloride.

radially—radiating from or converging to a common center and/or having or characterized by parts so arranged or so radiating.

rail—a guide, running surface, bar, and/or member configured for supporting and/or guiding another thing.

range—a measure of an extent of a set of values and/or an amount and/or extent of variation.

ratio—a relationship between two quantities expressed as a quotient of one divided by the other.

receive—to gather, take, acquire, obtain, accept, get, and/or have bestowed upon.

recommend—to suggest, praise, commend, and/or endorse.

reduce—to make and/or become lesser and/or smaller.

relative—considered with reference to and/or in comparison to something else.

releasably—capable of being freed, in a substantially non-destructive manner, from something that binds, fastens, or holds back.

release—to let go and/or free from something that restrains, binds, fastens, and/or holds back.

remain—to continue to be in the same place; to stay or stay behind; and/or to be left after the removal, loss, passage, or destruction of other.

remove—to eliminate, remove, and/or delete, and/or to move from a place or position occupied.

repeat—to do again and/or perform again.

repeatedly—again and again; repetitively.

request—to express a desire for and/or ask for.

reservoir—a receptacle or chamber for storing and/or directing movement of a fluid.

result—(n.) an outcome and/or consequence of a particular action, operation, and/or course; (v.) to cause an outcome and/or consequence of a particular action, operation, and/or course.

retain—to restrain, keep, and/or hold.

right—opposite of left and/or of and/or designating the side of something and/or someone that faces east when the front is turned towards the north.

rightward—toward the right.

ring—a substantially toroidal object which can be imagined as having been generated by rotating a closed loop (e.g., ellipse, circle, irregular curve, polygon, etc.) about a fixed line external to the loop.

rotational—about and/or around an axis.

said—when used in a system or device claim, an article indicating a subsequent claim term that has been previously introduced.

schedule—a standard size for a pipe.

seal—(v.) to shut close; to keep close; to make fast; to keep secure; to prevent leakage; (n.) a device configured to shut close; to keep close; to make fast; to keep secure; and/or to prevent leakage.

seat—(n) a sealing, supporting, and/or mating surface; (v) to attach to, seal against, support with, and/or bring firmly into contact with.

second—a label for an element in one or more patent claims, the element other than a "first" referenced element of a similar type, but the label does not necessarily imply any type of ordering to how that "second" element or the "first" element is implemented in embodiments of the claimed subject matter.

secure—to fasten, connect, and/or prevent substantial relative movement of.

segment—all co-linear points located between and including two points.

select—to make a choice or selection from alternatives.

selectable—capable of being chosen and/or selected.

selectively—via choice.

set—a related plurality.

shape—a characteristic surface, outline, and/or contour of an entity.

shape-memory—the ability of a material to be deflected and then return to its original shape when the deflection force is removed.

shift—to re-direct, move, and/or transfer.

slidably—to be able to open, close, and/or fit together with a sliding motion of a first part relative to a second part.

slope—(v) to position at an angle and/or incline with respect to vertical or horizontal; (n) an inclined line, surface, plane, position, and/or direction; and/or with respect to a first point and a second point that are intersected by a straight line, a ratio of the change in the ordinal value from the first point to the second point, to the change in the abscissal value from the first point to the second point; and/or a measure of a degree of inclination; and/or a rate of change.

smooth—lacking substantial surface irregularities, roughness, and/or projections.

source—a point and/or thing at or from which something originates, springs into being, and/or from which it derives and/or is obtained.

species—a class of individuals and/or objects grouped by virtue of their common attributes and assigned a common name; a division subordinate to a genus.

spherical—having the shape of, or substantially resembling, a sphere.

spring—a flexible elastic object, such as a coil of wire, bent bar, coupled set of plates, washer, etc., that regains its original shape after being compressed or extended, is used to store mechanical energy, and is often made of hardened and tempered material, such as steel. Types of springs can include coil springs, helical springs, conical springs, torsion springs, tension springs, compression springs, leaf springs, V-springs, spiral springs, spring washers, gas springs, rubber bands, etc.

stationary—substantially fixed with respect to an object of reference.

stop—(n) a device and/or means that obstructs, blocks, deters, and/or plugs up; (v) to interrupt, cease and/or end, and/or to block and/or prevent the flow or passage of.

store—to place, hold, and/or retain data, typically in a memory.

stream—a flow of water and/or other fluid substantially—to a considerable, large, and/or great, but not necessarily whole and/or entire, extent and/or degree.

such that—in a manner that results in.

sufficient—a degree and/or amount necessary to achieve a predetermined result.

support—to bear the weight of, especially from below.

surface—an outer boundary of a body, object, and/or thing and/or any material layer and/or face constituting and/or resembling such a boundary.

swirling—a whirling and/or eddying motion and/or mass system—a collection of mechanisms, devices, machines, articles of manufacture, processes, data, and/or instructions, the collection designed to perform one or more specific functions.

that—used as the subject or object of a relative clause.

therein—within.

thickness—a quantitative measure of a dimension associated with an object.

third—a label for an element in one or more patent claims, the element other than a "first" or "second" referenced element of a similar type, but the label does not necessarily imply any type of ordering to how that "third" element is implemented in embodiments of the claimed subject matter.

through—across, among, between, and/or in one side and out the opposite and/or another side of.

to—a preposition adapted for use for expressing purpose.

toward—used to indicate a destination and/or in a physical and/or logical direction of.

transform—to change in measurable: form, appearance, nature, and/or character.

transmit—to send as a signal, provide, furnish, and/or supply.

trap—a device configured for sealing a passage against the escape of gases.

treatment—an act, manner, or method of handling and/or dealing with someone and/or something.

two—a cardinal number equal to one plus one.

unitary—whole, not separated, and/or having the nature of a unit.

until—till and/or up to the time that and/or when.

upon—immediately or very soon after; and/or on the occasion of.

upper—in a high position relative to something else.

upward—toward and/or facing up and/or a top.

use—to put into service.

valve—a device that regulates flow through a pipe and/or through an aperture by opening, closing, and/or obstructing a port and/or passageway.

vector—an expression characterized by a magnitude and a direction.

vertical—substantially perpendicular to horizontal.

via—by way of, with, and/or utilizing.

vibrate—to move back and forth or to and fro, especially rhythmically and/or rapidly.

volume—a mass and/or a three-dimensional region that an object and/or substance occupies.

wall—a partition, structure, and/or mass that serves to enclose, divide, separate, segregate, define, and/or protect a volume.

water—a transparent, odorless, tasteless liquid containing approximately 11.188 percent hydrogen and approximately 88.812 percent oxygen, by weight, characterized by the chemical formula H2O, and, at standard pressure (approximately 14.7 psia), freezing at approximately 32° F. or 0 C and boiling at approximately 212° F. or 100 C.

water column—(abbreviated "WC") the pressure exerted by a column of water of 1 inch in height at a temperature of 4° C. (39.2° F.) and the standard acceleration of gravity, such that 1 inch of water column is approximately 249 pascals.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

while—for as long as, during the time that, and/or at the same time that.

width—a measurement of the extent of something along an, often substantially horizontal, dimension.

with—accompanied by.

with regard to—about, regarding, relative to, and/or in relation to.

with respect to—about, regarding, relative to, and/or in relation to.

within—inside the limits of.

without—not accompanied by.

yet—not thus far.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. An automatic condensate release device configured to operably selectively release condensate received from a condensate-producing unit, the automatic condensate release device comprising:

a substantially spherical valve that defines a valve outer surface;

an elongate housing defining:

a condensate reservoir;

a valve chamber configured to operably contain the valve; and a condensate release port configured to operably convey condensate from the condensate reservoir into the valve chamber;

a valve seat configured to, when in contact with the valve outer surface, operably form a fluidic seal of the condensate release port; and a helical spring located substantially within the valve chamber and configured to operably bias the valve toward the valve seat;

wherein:

the housing defines a longitudinal housing axis, a first housing portion, and a second housing portion;

the housing defines a lock configured to operably secure the first housing portion to the second housing portion, the lock comprising:

at least two elongate arms that have shape memory, each arm defining a first locking surface; and a second locking surface, wherein the first locking surface is configured to operably non-destructively releasably, clickably, lockingly engage with the second locking surface, such that each first locking surface contacts, bears on, opposes, and/or extends substantially parallel to, its second locking surface; and the first housing portion and the second housing portion cooperate with an O-ring to compressively fluidically seal the housing and circumferentially fluidically seal the housing when each first locking surface is operably non-destructively releasably, clickably, lockingly engaged with its corresponding second locking surface.

2. The automatic condensate release device of claim 1, wherein:
the housing defines a spring seat configured to operably anchor the helical spring to the housing.

3. The automatic condensate release device of claim 1, wherein:
the valve chamber defines at least one valve guide configured to operably slidably direct the valve toward and away from the valve seat along the longitudinal housing axis.

4. The automatic condensate release device of claim 1, wherein:
the spring defines a longitudinal helix axis that is coaxial with the longitudinal housing axis.

5. The automatic condensate release device of claim 1, wherein:
in an operable configuration, the spring is pre-loaded to approximately 0.75 inches water column (0.027 psi).

6. The automatic condensate release device of claim 1, wherein:
the automatic condensate release device is configured to operably release condensate toward a drain conduit while allowing substantially no air below the valve seat and within the automatic condensate release device to flow toward the condensate-producing unit and substantially no air above the valve seat and within the automatic condensate release device to flow into the drain conduit, provided that the air above the valve seat is pressurized, relative to air contacting yet outside the automatic condensate release device, between approximately negative 2 inches water column and approximately positive 0.625 inches water column.

7. The automatic condensate release device of claim 1, wherein:
the housing is configured to operably form an inlet circumferential fluidic seal formed between a selectable one of:
a first inlet connection surface and a 20 millimeter (nominal internal diameter) PVC pipe fitting;
a second inlet connection surface and a 0.75 inch (nominal internal diameter) schedule 40 PVC pipe fitting; and
a third inlet connection surface and a 0.625 inch (nominal internal diameter) flexible mini-split hose.

8. The automatic condensate release device of claim 1, wherein:
the housing is configured to operatively form an inlet circumferential fluidic seal formed between a selectable one of:
a first outlet connection surface and a 20 mm (nominal internal diameter) PVC pipe fitting;
a second outlet connection surface and a 0.75 inch (nominal internal diameter) schedule 40 PVC pipe fitting; and
a third outlet connection surface and a 0.625 inch (nominal internal diameter) flexible mini-split hose.

9. The automatic condensate release device of claim 1, wherein:
the automatic condensate release device is operable when the longitudinal housing axis is oriented within approximately 45 degrees of vertical.

10. The automatic condensate release device of claim 1, wherein:
the housing is formed from a substantially clear material.

11. The automatic condensate release device of claim 1, wherein:
the first housing portion is configured to non-destructively disconnect from the second housing portion without rotation of the first housing portion relative to the second housing portion about the longitudinal housing axis.

12. The automatic condensate release device of claim 1, wherein, in an operative embodiment:
the automatic condensate release device is fluidically connected to the condensate-producing unit via a condensate conduit and the automatic condensate release device is fluidically connected to a condensate drain via a drain conduit; and
the first housing portion is configured to non-destructively disconnect from the second housing portion without disconnection of the automatic condensate release device from the condensate conduit or the drain conduit.

13. A condensate management system comprising the automatic condensate release device of claim 1.

14. A system comprising:
a condensate-producing unit; and
the automatic condensate release device of claim 1;
wherein:
the condensate-producing unit is fluidically connected to the automatic condensate release device.

* * * * *